(12) United States Patent
Miller et al.

(10) Patent No.: US 9,901,828 B2
(45) Date of Patent: Feb. 27, 2018

(54) METHOD FOR AN AUGMENTED REALITY CHARACTER TO MAINTAIN AND EXHIBIT AWARENESS OF AN OBSERVER

(75) Inventors: Thomas Miller, Los Angeles, CA (US); George Weising, Culver City, CA (US)

(73) Assignee: Sony Interactive Entertainment America LLC, San Mateo, CA (US)

(*) Notice: Subject to any disclaimer, the term of this patent is extended or adjusted under 35 U.S.C. 154(b) by 1196 days.

(21) Appl. No.: 12/963,585

(22) Filed: Dec. 8, 2010

(65) Prior Publication Data
US 2011/0242134 A1    Oct. 6, 2011

Related U.S. Application Data

(60) Provisional application No. 61/319,021, filed on Mar. 30, 2010.

(51) Int. Cl.
*G09G 5/00* (2006.01)
*A63F 13/655* (2014.01)
(Continued)

(52) U.S. Cl.
CPC .......... *A63F 13/655* (2014.09); *A63F 13/211* (2014.09); *A63F 13/213* (2014.09);
(Continued)

(58) Field of Classification Search
CPC ............................. G06T 19/00; G06T 19/006
(Continued)

(56) References Cited

U.S. PATENT DOCUMENTS 5,724,561 A * 3/1998 Tarolli et al. ................. 345/561
7,094,153 B2 * 8/2006 Kunieda ................. A63F 13/10
348/E5.028
(Continued)

FOREIGN PATENT DOCUMENTS

CN    1284844    9/1999
CN    1231753    10/1999
(Continued)

OTHER PUBLICATIONS

Notice Concerning Transmittal of International Preliminary Report on Patentability (IPRP) issued in International Application No. PCT/US2011/024792, dated Oct. 11, 2012, with IPRP and Written Opinion of the International Searching Authority (9 total pages).
(Continued)

*Primary Examiner* — Jin-Cheng Wang
(74) *Attorney, Agent, or Firm* — Martine Penilla Group, LLP

(57) ABSTRACT

Methods and systems for enabling an augmented reality character to maintain and exhibit awareness of an observer are provided. A portable device held by a user is utilized to capture an image stream of a real environment, and generate an augmented reality image stream which includes a virtual character. The augmented reality image stream is displayed on the portable device to the user. As the user maneuvers the portable device, its position and movement are continuously tracked. The virtual character is configured to demonstrate awareness of the user by, for example, adjusting its gaze so as to look in the direction of the portable device.

15 Claims, 18 Drawing Sheets

(51) Int. Cl.
   *A63F 13/5255*   (2014.01)
   *A63F 13/213*    (2014.01)
   *A63F 13/211*    (2014.01)
   *A63F 13/92*     (2014.01)
   *G06T 19/00*     (2011.01)

(52) U.S. Cl.
   CPC .......... *A63F 13/5255* (2014.09); *A63F 13/92* (2014.09); *G06T 19/006* (2013.01); *A63F 2300/105* (2013.01); *A63F 2300/1093* (2013.01); *A63F 2300/204* (2013.01); *A63F 2300/6607* (2013.01); *A63F 2300/6676* (2013.01); *A63F 2300/69* (2013.01); *G09G 2340/12* (2013.01); *G09G 2340/125* (2013.01); *G09G 2340/14* (2013.01); *G09G 2354/00* (2013.01)

(58) Field of Classification Search
   USPC .......................... 345/633–634; 715/758–764
   See application file for complete search history.

(56) References Cited

U.S. PATENT DOCUMENTS

| | | | |
|---|---|---|---|
| 7,386,799 | B1 | 6/2008 | Clanton et al. |
| 7,636,645 | B1 | 12/2009 | Yen et al. |
| 8,194,101 | B1* | 6/2012 | Mann et al. .................. 345/633 |
| 8,411,091 | B2* | 4/2013 | Horri et al. .................. 345/427 |
| 2002/0090985 | A1* | 7/2002 | Tochner et al. ................... 463/1 |
| 2003/0156144 | A1 | 8/2003 | Morita |
| 2005/0242189 | A1* | 11/2005 | Rohs ........................ 235/462.46 |
| 2006/0105838 | A1 | 5/2006 | Mullen |
| 2008/0081701 | A1* | 4/2008 | Shuster ................... A63F 13/30 463/42 |
| 2008/0158232 | A1* | 7/2008 | Shuster ................... G06T 13/40 345/474 |
| 2008/0194323 | A1* | 8/2008 | Merkli et al. .................. 463/30 |
| 2008/0262911 | A1* | 10/2008 | Altberg et al. ................. 705/14 |
| 2009/0005140 | A1* | 1/2009 | Rose et al. .................... 463/7 |
| 2009/0112906 | A1* | 4/2009 | Shuster ................... A63F 13/12 |
| 2009/0164916 | A1* | 6/2009 | Jeong ..................... A63F 13/12 715/753 |
| 2010/0287485 | A1* | 11/2010 | Bertolami et al. ............ 715/764 |
| 2010/0321540 | A1* | 12/2010 | Woo et al. ................... 348/241 |
| 2012/0223967 | A1* | 9/2012 | Mann et al. .................. 345/633 |

FOREIGN PATENT DOCUMENTS

| | | | |
|---|---|---|---|
| EP | 1866043 A1 | 12/2007 | |
| WO | 99/34327 A3 | 7/1999 | |
| WO | 2003/058518 | 7/2003 | ............ G06F 17/60 |
| WO | 03058518 | 7/2003 | |
| WO | 2009/059065 A1 | 5/2009 | |

OTHER PUBLICATIONS

Office Action issued in Mexican Application No. MX/a/2012/011425 dated Jul. 2, 2014 (with English translation) (6 total pages).
Chinese Office Action issued in Chinese Application No. 201180027017.0, dated Mar. 26, 2014 (with English translation).
First Office Action issued in corresponding Chinese Patent Application No. 201510379034.0, dated Oct. 20, 2017 (11 total pages).

* cited by examiner

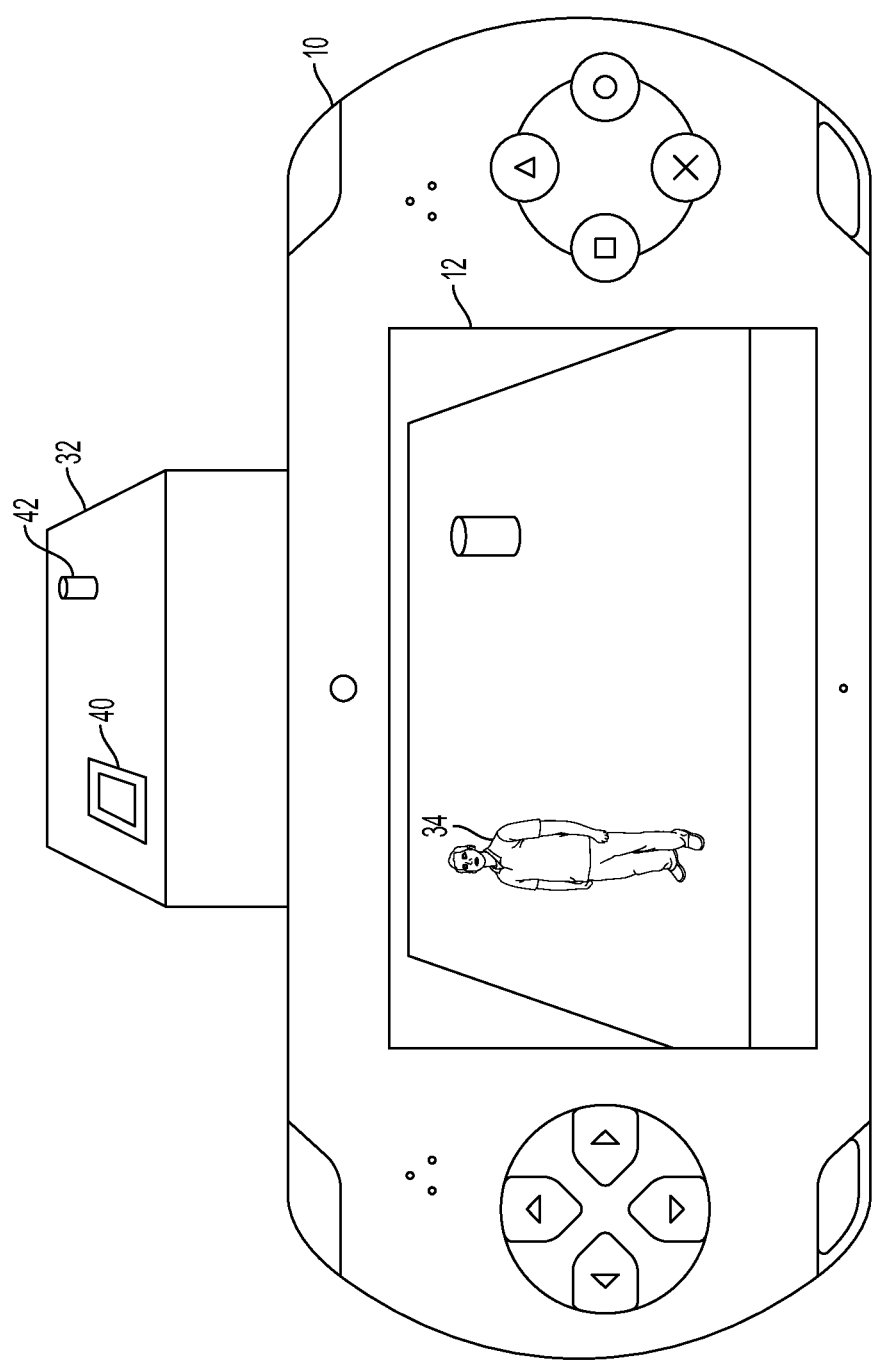

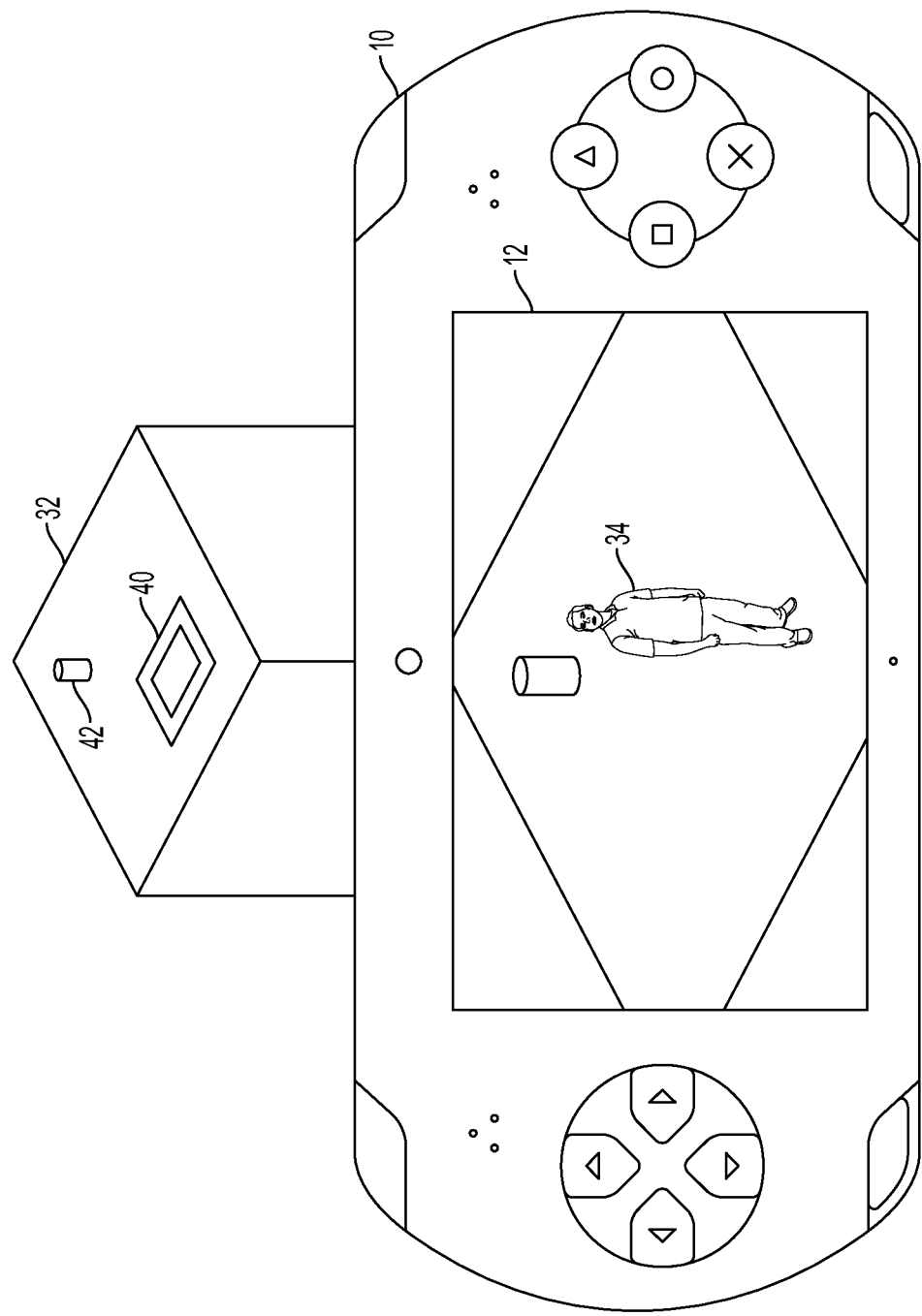

METHOD FOR AN AUGMENTED REALITY CHARACTER TO MAINTAIN AND EXHIBIT AWARENESS OF AN OBSERVER

CLAIM OF PRIORITY

This application claims priority from U.S. Provisional Patent Application No. 61/319,021 filed on Mar. 30, 2010 and entitled "METHOD FOR AN AUGMENTED REALITY CHARACTER TO MAINTAIN AND EXHIBIT AWARENESS OF AN OBSERVER," which is incorporated herein by reference in its entirety for all purposes.

BACKGROUND

1. Field of the Invention

The present invention relates to methods and systems for enabling an augmented reality character to maintain and exhibit awareness of an observer.

2. Description of the Related Art

A growing segment of the video game industry involves the use of portable hand-held devices. Examples of such portable devices include dedicated gaming devices, such as those manufactured by Sony Computer Entertainment Inc. and others, as well as other types of portable devices such as smartphones, PDA's, digital multimedia players, etc. As the computing power of such portable devices has increased, so has the ability of the portable devices to handle increasingly complex programs and tasks.

For example, today's portable devices may include several different types of hardware integrated into a single device. Many such devices may include a color display, a camera, speakers, and an input mechanism such as buttons, a touchscreen or a stylus.

It is in this context that embodiments of the invention arise.

SUMMARY

Embodiments of the present invention provide methods and systems for an augmented reality character to maintain and exhibit awareness of an observer. It should be appreciated that the present invention can be implemented in numerous ways, such as a process, an apparatus, a system, a device or a method on a computer readable medium. Several inventive embodiments of the present invention are described below.

In one embodiment, a method for causing a virtual character to demonstrate awareness of a user's position or activity is provided. According to the method, the user's position is detected by detecting the position of a portable device. The portable device is substantially colocational with the user, and the position and movement of the portable device are controlled by the user. The portable device includes a camera and a display. A first image stream of a real-world scene is captured at the camera. A second image stream is generated based on the first image stream, the second image stream comprising an augmented reality scene formed by inserting a virtual character into the real-world scene as captured in the first image stream. The virtual character is configured to perform an action indicating awareness of the position or activity of the user. The second image stream is displayed on the display of the portable device.

In one embodiment, the insertion of the virtual character into the real-world scene comprises placement of the virtual character on a surface identified within the real-world scene.

According to another embodiment, the detection of the position of the portable device comprises identification of anchors within the first image stream, the anchors being tracked during movement of the portable device. In various embodiments, the anchors may include augmented reality tags or features within the real-world scene.

In one embodiment, the performance of an action indicating awareness occurs automatically, without requiring a command from the user.

In one embodiment, the action indicating awareness comprises adjusting a view direction of the virtual character.

In one embodiment, the adjustment of the view direction is in the direction of the position of the portable device, and the method further includes a method operation of continuously updating the adjustment of the view direction as the portable device moves in three-dimensional space.

In one embodiment, the adjustment of the view direction of the virtual character includes adjustment of the head or eyes of the virtual character so as to look in the direction of the portable device.

In another embodiment, the adjustment of the view direction is in the direction of a position towards which the camera of the portable device is directed.

In an alternative embodiment of the invention, a method for causing a virtual character to demonstrate awareness of a user's position or activity is provided. According to the method, a first image stream of a real-world scene is captured at a camera of a portable device. The portable device is substantially colocational with the user, and the position and movement of the portable device are controlled by the user. One or more markers in the first image stream are identified and tracked, and the position and orientation of the portable device is tracked based on the tracking of the one or more markers. A second image stream is generated based on the first image stream, the second image stream depicting a virtual reality scene positioned with reference to the markers in the first image stream. The virtual reality scene includes a virtual character configured to perform an action indicating awareness of the position or activity of the user. The second image stream is displayed on a display of the portable device.

In another embodiment of the invention, a method for providing user interactivity with a virtual character is provided. According to the method, user interactivity with a computer program is initiated. User interaction with a virtual character of the computer program is determined. sensor data from the user is detected during the user's interaction with the virtual character. The position of the user is tracked using the sensor data. Further according to the method, a position of the virtual character is detected during the user's interaction with the virtual character. And a relative positioning between the user's position and the position of the virtual character is identified during the user's interaction with the virtual character. A context of the user's interaction with the virtual character is identified. And a signaling attribute for the context of the user's interaction with the virtual character is also identified. The signaling attribute is applied to the virtual character to convey an awareness of the user by the virtual character.

In one embodiment, the computer program provides a virtual reality environment, the virtual reality environment including the virtual character. And the user interactivity with the computer program includes interactivity with the virtual environment.

In another embodiment, the computer program provides an augmented reality environment, the augmented reality environment including the virtual character. And the user interactivity with the computer program includes interactivity with the augmented reality environment.

In one embodiment, the sensor data includes an image stream captured by a portable device controlled by the user. And the tracking of the position of the user includes identification and tracking of markers within the image stream to enable determination of a position of the portable device.

In one embodiment, the context of the user's interaction with the virtual character may include a location within a real-world environment, a location within a virtual environment, or a stage within the computer program.

In one embodiment, the signaling attribute may include adjustment of the virtual character's view direction, movement of the virtual character, or gesturing by the virtual character.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIG. 4A illustrates a close-up view of a portable device, as it is being used to view an augmented reality scene, in accordance with an embodiment of the invention.

FIG. 4B illustrates a close-up view of a portable device, as it is being used to view an augmented reality scene, in accordance with an embodiment of the invention.

DETAILED DESCRIPTION

The following embodiments describe methods and apparatus for a system that enables interactivity with an augmented reality character. During the interactivity, the augmented reality character is capable of maintaining or exhibiting awareness of an observer. The observer, in one embodiment, is the user of a portable device, who can view the augmented reality character through a screen of the portable device. As the user moves the portable device around in three dimensional space, the augmented reality character maybe look back a the user. In one embodiment, the augmented reality character looks back at the user by tracking the location of the portable device, as it is moved in the three dimensional space. The time or times when the augmented reality character looks back at the user depends on a program or contact of the interactivity by the user with the augmented reality character. If the user is interacting with the augmented reality character, by treating the augmented reality character as an avatar, the avatar may only exhibit awareness at certain points in time, depending on the context and nature of the interactivity. Accordingly, various examples will now be described, which illustrate methods for enabling an augmented reality character or object to demonstrate or exhibit awareness to or of some point in three dimensional space.

It will be obvious, however, to one skilled in the art, that the present invention may be practiced without some or all of these specific details. In other instances, well known process operations have not been described in detail in order not to unnecessarily obscure the present invention.

Figure 1A:
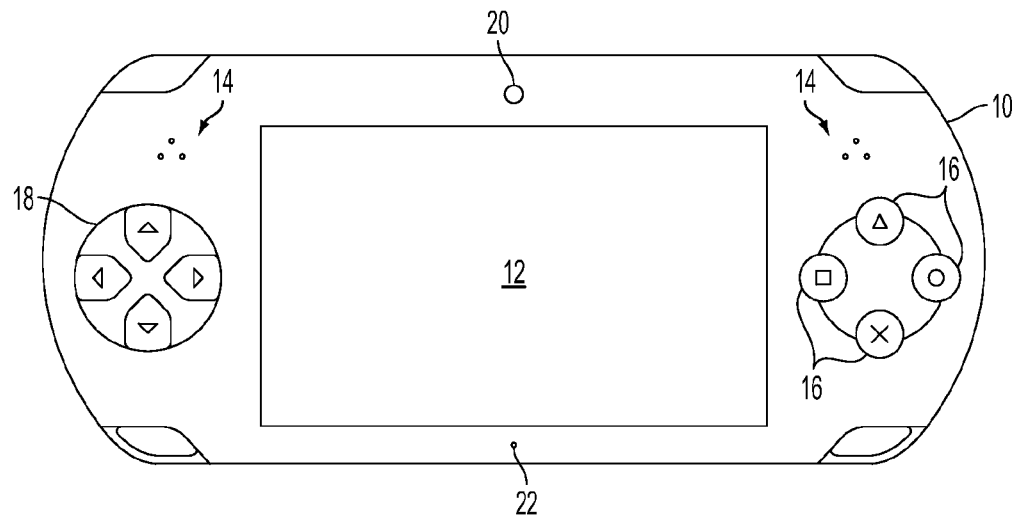
FIG. 1A illustrates a front view of an exemplary portable device, in accordance with an embodiment of the invention.

With reference to FIG. 1A, a front view of an exemplary portable device 10 is shown, in accordance with an embodiment of the invention. The portable device 10 includes a display 12 for displaying graphics. In embodiments of the invention, the display 12 is utilized to show an augmented reality character in real-time. In various embodiments of the invention, the display 12 may incorporate any of various display technologies, such as touch-sensitivity. The portable device 10 includes speakers 14 for facilitating audio output. The audio output from speakers 14 may include any sounds relating to an augmented reality character, such as sounds of the augmented reality character, other game sounds, a background soundtrack, sounds from a remote player, or any other type of sound.

The portable device 10 includes buttons 16 and directional pad 18, which function as input mechanisms for receiving input from a user of the portable device. In embodiments of the invention, it is contemplated that any of various other types of input mechanisms may be included in the portable device 10. Other examples of input mechanisms may include a stylus, touch-screen, keyboard, keypad, touchpad, trackball, joystick, trigger, or any other type of input mechanism which may be useful for receiving user input.

A front-facing camera 20 is provided for capturing images and video of a user of the portable device 10, or of other objects or scenery which are in front of the portable device 10. Additionally, a microphone 22 is included for capturing audio from the surrounding area, such as sounds or speech made by a user of the portable device 10.

Figure 1B:
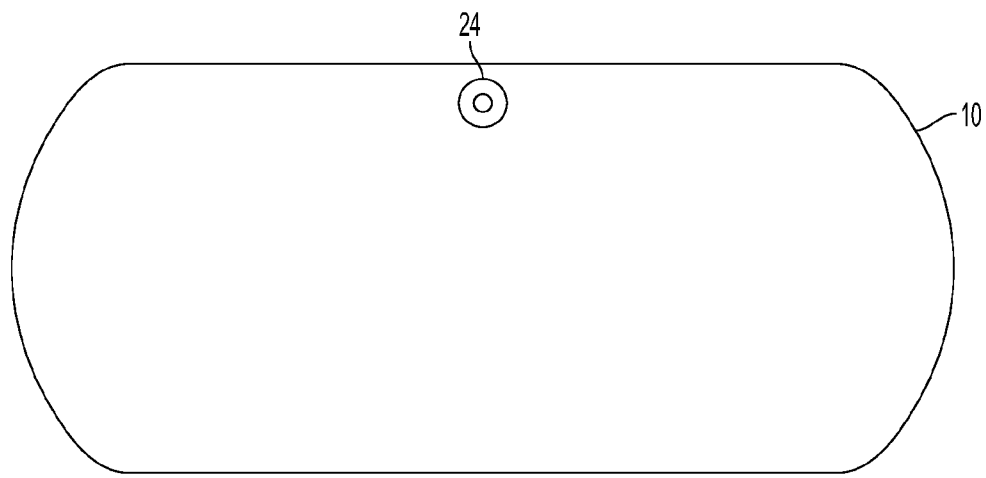
FIG. 1B illustrates a rear view of a portable device, in accordance with an embodiment of the invention.

With reference to FIG. 1B, a rear view of a portable device 10 is shown, in accordance with an embodiment of the invention. A rear-facing camera 24 is provided for capturing images and video of objects and scenery which as located behind the portable device 10. The captured video from the camera 24 may be displayed on the display 12 in real-time, and may be augmented with virtual objects so as to provide an augmented reality scene that is displayed to a user.

Additionally, the portable device 10 may include any of various sensors for detecting position and motion of the portable device 10. In some embodiments, the portable device 10 may include one or more of a gyroscope, a magnetometer, and an accelerometer, to facilitate detection of the position and movement of the portable device 10.

The foregoing exemplary portable device has been described in some detail in order to illustrate one possible embodiment of a portable device in accordance with an embodiment of the invention. However, throughout this specification, reference will be made to portable devices, of which the foregoing illustrated example is but one example. The scope of the present invention is not intended to be limited in any way in any particular portable device, but may readily extend to any of various kinds of portable devices. Examples of portable devices include portable game devices, personal digital assistants (PDA's), smartphones, tablet personal computers, digital cameras, etc. For purposes of this disclosure a portable device will be understood as any device which is capable of being maneuvered by a user and capable of displaying an augmented reality character to the user.

Figure 2:
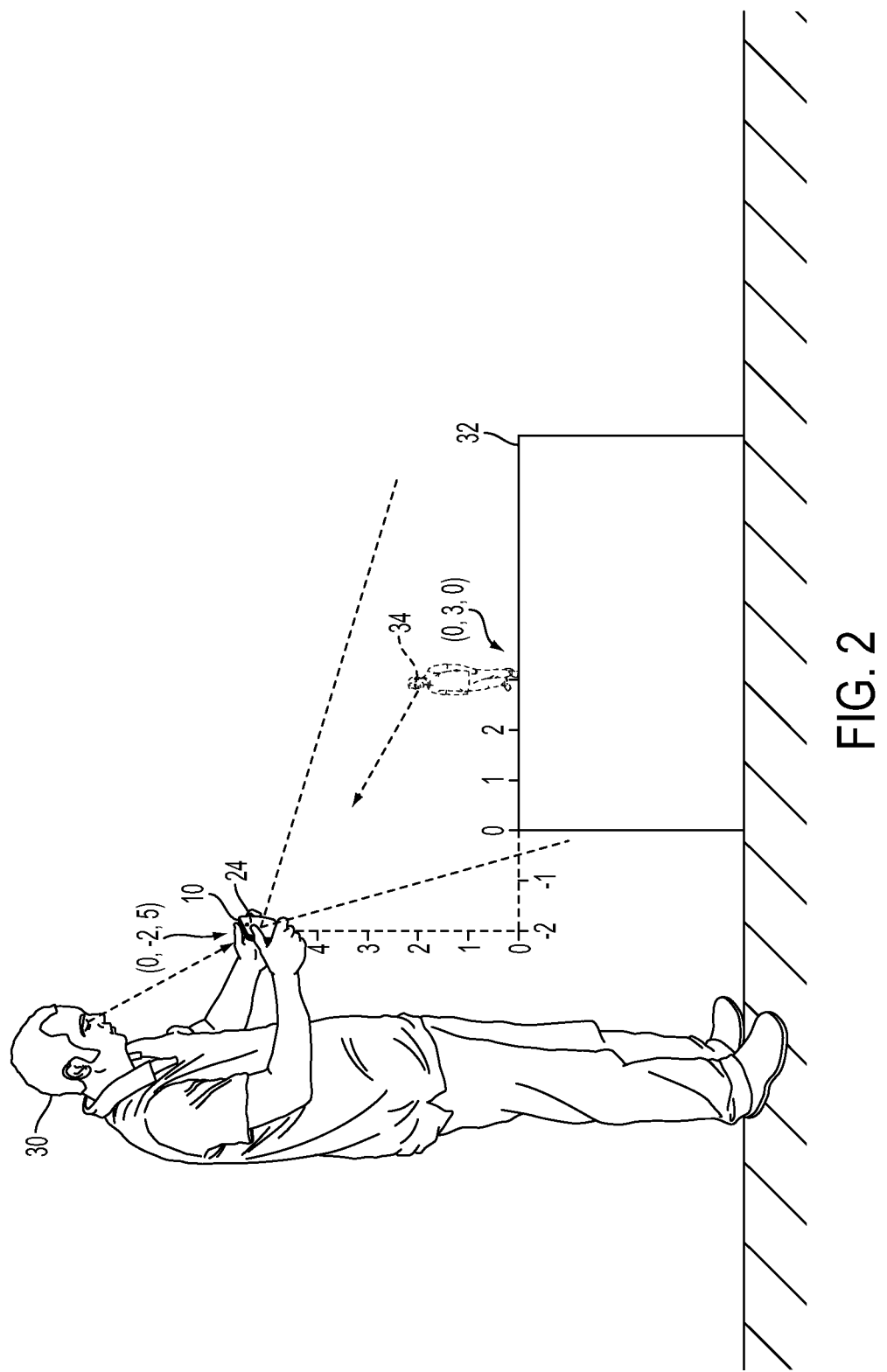
FIG. 2 illustrates a user using a portable device to view an augmented reality scene, in accordance with an embodiment of the invention.

With reference to FIG. 2, a user 30 is shown using a portable device 10 to view an augmented reality scene, in accordance with an embodiment of the invention. As shown, the user 30 holds the portable device 10 so as to orient the rear-facing camera 24 towards a table 32. The camera 24 captures an image stream of the table 32. This captured image stream is augmented in real-time with a virtual character 34 so as to generate an augmented reality image stream. The augmented reality image stream is displayed in real-time on a display of the portable device 10, which the user 30 views.

The virtual character 34 is shown at FIG. 2 on the table 32 for illustrative purposes only. Obviously, the virtual character 34 does not actually exist on the table 32, but rather appears in the augmented reality image stream being viewed by the user 30, and therefore appears to the user 30 to be situated on the table 32 as shown in FIG. 2. Throughout this specification, reference will be made to virtual characters and virtual objects configured to perform various actions or exhibit certain characteristics. Those skilled in the art will understand this to mean that the virtual characters or objects will appear as such when viewed by an observer on an appropriate viewing device which enables the observer the see the virtual character or object in an augmented reality image stream.

In one embodiment, the virtual character 34 is configured to demonstrate awareness of the position of the portable device 10. The virtual character 34 may be configured to take any of various actions which demonstrate awareness of the position of the portable device 10. For example, the virtual character 34 may be configured to look in the direction of the portable device 10, so that it appears that the virtual character 34 is looking at the user 30. Or the virtual character 34 may be configured to move in the direction of the portable device 10, so that it appears that the virtual character 34 is moving towards the user 30. In numerous other embodiments, the virtual character 34 may be configured to take any action (or inaction, if appropriate) demonstrating awareness of the position of the portable device 10.

Any of various technologies for generating an augmented reality image stream may be applied without departing from the scope of the present invention. For example, in one embodiment, an augmented reality (AR) tag may be placed on the table 32, and utilized as a fiduciary marker for generating the augmented reality image stream. The AR tag may be an object or figure that is recognized when present in the captured image stream of the real environment. The AR tag serves as a fiduciary marker which enables determination of a location within the real environment. Additionally, the perspective distortion of the AR tag in the captured image stream indicates the orientation of the AR tag.

Based on the identified location and orientation of the AR tag, an augmented reality image stream may be generated by superimposing a virtual object or character having a location and orientation related to the AR tag. For example, in one embodiment, the virtual character 34 can be situated on top of (e.g. "standing" on the AR tag) or substantially colocational with the AR tag. In other embodiments, the virtual character 34 may be situated proximate to or away from the AR tag. The AR tag may be displayed within the augmented reality image stream, or may be selectively removed from the augmented reality image stream.

In some embodiments, one or more AR tags may be utilized in the same environment. The use of multiple AR tags provides for multiple reference points which are defined by the AR tags. Multiple AR tags which are spread throughout a real environment can enable more robust determinations of location and orientation. This can improve the accuracy with which virtual objects are placed in the augmented reality image stream, and/or may provide for a broader operational range as multiple AR tags increase the effective area over which the portable device 10 can be maneuvered while still maintaining at least one of the AR tags within the field of view of the portable device's camera 24.

In other embodiments, any of various image analysis and recognition methods may be applied for purposes of generating the augmented reality image stream based on the captured image stream. For example, natural feature tracking methods or simultaneous location and mapping (SLAM) methods may be applied to the captured image stream in order to generate the augmented reality image stream. Natural feature tracking methods generally entail the detection and tracking of "natural" features within a real environment (as opposed to artificially introduced fiducials) such as textures, edges, corners, etc. In other embodiments of the invention, any one or more image analysis methods may be applied in order to generate the augmented reality image stream based on the captured image stream. For example, a combination of AR tags and natural feature tracking or SLAM methods might be employed in order to produce the augmented reality image stream.

In accordance with embodiments of the invention, the position of the portable device 10 is constantly tracked. The tracking of the position of the portable device 10 may be accomplished based on the aforementioned technologies which are utilized to generate the augmented reality image stream. For example, an AR tag may serve as a reference marker which enables determination of the position, orientation and movement of the portable device 10 relative to the AR tag, based on the detection of the perspective distortion of the AR tag within the captured image stream. Multiple AR tags might be employed to improve the accuracy of the determination of the position and orientation of the portable device 10. Or in other embodiments, natural feature tracking methods may be employed for purposes of tracking the position and orientation of the portable device 10.

Additionally, the movement of the portable device 10 may be tracked based on information from motion sensitive hardware within the portable device 10, such as an accelerometer, magnetometer, or gyroscope. In one embodiment, an initial position of the portable device 10 is determined, and movements of the portable device 10 in relation to the initial position are determined based on information from an accelerometer, magnetometer, or gyroscope. In other embodiments, information from motion sensitive hardware of the portable device 10, such as an accelerometer, magnetometer, or gyroscope, may be used in combination with the aforementioned technologies, such as AR tags, or natural feature tracking technologies, so as to ascertain the position and movement of the portable device 10.

As shown with continued reference to FIG. 2, the positions of objects within the real environment may be described with reference to a coordinate space. In the embodiment shown, a location in the three-dimensional space is represented by Cartesian coordinates (x, y, z), where x and y are in the horizontal directions and z represents the vertical direction. By way of example only, the position of the portable device 10 as shown is represented by the coordinates (0, −2, 5). Furthermore, the apparent position of the virtual character 34 in the real environment—in other words, as it appears to be located in the augmented reality image stream—can be represented by coordinates of the real environment as well. In this case, the virtual character 34 has the coordinates (0, 3, 0). The location of the portable device is continuously tracked, and may be represented by continuously updated coordinates. Likewise, the location of the virtual character 34 may also be continuously determined and represented by its corresponding coordinates. In other embodiments of the invention, any of various coordinate systems, such as cylindrical or spherical coordinate systems, may be applied without departing from the scope of the present invention.

Figure 3B:
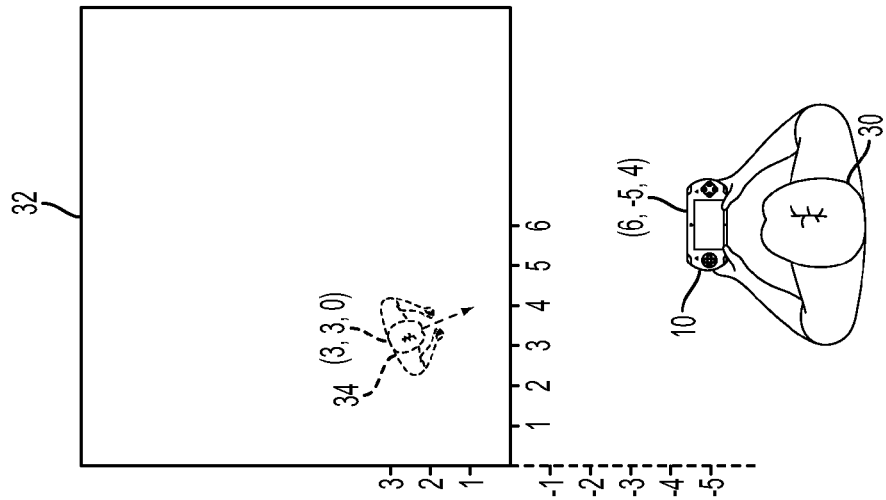
FIG. 3B illustrates an overhead view of a user interacting with a virtual character, in accordance with an embodiment of the invention.
Figure 3A:
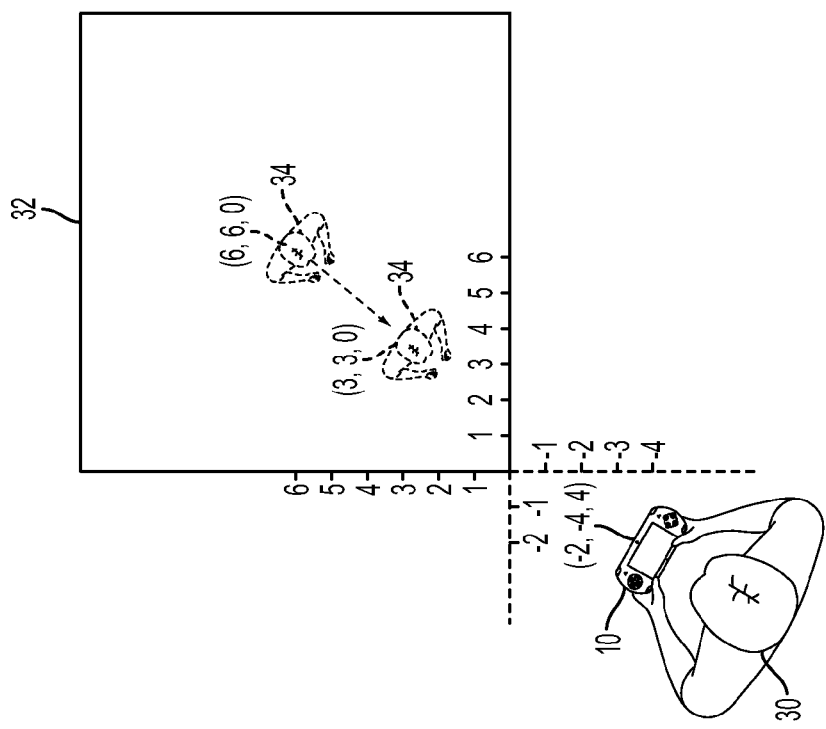
FIG. 3A illustrates an overhead view of a user interacting with a virtual character, in accordance with an embodiment of the invention.

With reference to FIG. 3A, an overhead view of a user 30 interacting with a virtual character 34 is illustrated, in accordance with an embodiment of the invention. As shown, the user 30 is holding portable device 10, and views the virtual character 34 as part of an augmented reality image stream which is being displayed on the portable device 10. The real environment which is being captured as an image stream by a camera on the portable device 10 includes a table 32. The virtual character 34 is inserted into the captured image stream to form the augmented image stream which is displayed on the portable device 10 to the user 30. In the augmented image stream, the virtual character 34 is generated so as to be situated on the table 32.

As shown, the locations of objects are represented by a coordinate system of the real environment. In the example shown, a Cartesian coordinate system is configured to have an origin at a corner of the table. It will be understood that the origin of the coordinate system may have any location in space, and is merely provided in the present instance as merely one example. The position of the portable device 10 is represented by the coordinates (−2, −4, 4), and the virtual character 34 has an initial position at (6, 6, 0).

In accordance with an embodiment of the invention, the virtual character 34 may be configured so as to exhibit awareness of the location of the portable device 10. For example, the virtual character 34 may be configured so as to look in the direction of the portable device 10. Or the virtual character 34 may be configured so as to the move in the direction of the portable device 10. For example, as shown at FIG. 3A, the virtual character 34 may move from an initial location at coordinates (6, 6, 0) to a position closer to the portable device 10 at coordinates (3, 3, 0). The virtual character 34 would thus appear to the user 30 to be moving towards him, thereby demonstrating awareness of his location.

Moreover, the virtual character 34 may be configured to continuously follow the movement of the portable device 10. As shown at FIG. 3B, the user 30 has moved to a new location, and thus moved the portable device 10 to coordinates (6, −5, 4). In one embodiment, the virtual character 34 is configured to track this movement by, for example, continuing to look in the direction of the portable device as it is moved. In another embodiment, the virtual character 34 may be configured to adjust its movements so as to continue to move in the direction of the portable device as it is moved. In so doing, the virtual character 34 exhibits an apparent awareness of the location of the portable device 10, and by extension an awareness of the location of the user 30.

In various embodiments of the invention, the specific action performed which indicates awareness on the part of the virtual character 34 of the location of the portable device 10 may be any action that is recognizable by the user 30 as such. By way of example only, and not by way of limitation, such actions which indicate awareness might include the following: looking in the direction of the portable device, moving in the direction of the portable device, making a sound, talking or otherwise communicating in the direction of the portable device or in such a manner as to indicate awareness of the user, making a gesture, making a facial expression, etc. In accordance with various embodiments of the invention, any action may be performed which indicates an awareness of the position of the portable device or the user by the virtual character.

With reference to FIG. 4A, a close-up view of a portable device 10 is shown, as it is being used to view an augmented reality scene, in accordance with an embodiment of the invention. The portable device 10 is shown as it might be seen from the perspective of a user. In the background, a table 32 is shown, with an optional AR tag 40 situated thereon. Also shown is a cup 42 situated on the table 32, for illustrative purposes. Items such as cup 42 may provide additional reference points which may be utilized to track the position and movement of the portable device 10, in accordance with methods described above. The table 32 is being captured as part of an image stream by a camera at the portable device 10. This captured image stream is augmented with a virtual character 34, so as to form an augmented reality image stream which is displayed on the display 12 of the portable device 10. Thus, as the user views the display 12, he is able to see the virtual character 34 in the augmented reality image stream as if the virtual character 34 were present in the real environment.

The virtual character 34 is configured so as to demonstrate awareness of the position of the portable device 10. Thus, in accordance with one embodiment as shown at FIG. 4A, the virtual character 34 is configured to look in the direction of the portable device 10.

At FIG. 4B, the portable device 10 has been moved to a different location in relation to the table 32. This change in the position of the portable device 10 is tracked. And as position of the portable device 10 is tracked, so the virtual character 34 is adjusted to look in the direction of the portable device 10, thereby demonstrating an awareness of the position of the portable device 10.

Figure 5A:
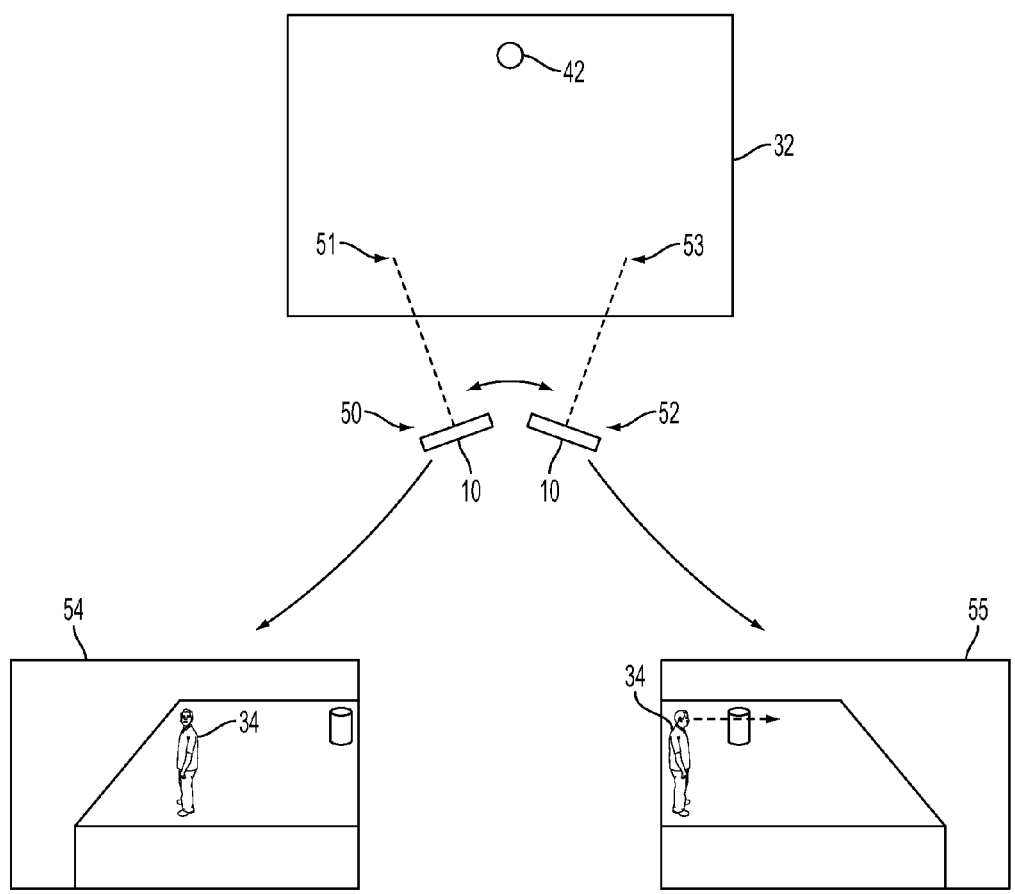
FIG. 5A illustrates an overhead view of a portable device being maneuvered to point in different directions, in accordance with an embodiment of the invention.

With reference to FIG. 5A, an overhead view of a portable device 10 being maneuvered to point in different directions is shown, in accordance with an embodiment of the invention. As shown, the portable device 10 is directed so that a camera of the portable device 10 is directed towards a table 32. Also shown is a cup 42 for illustrative purposes. In one instance, the portable device 10 is maneuvered so as to be positioned at a location 50 and have its camera directed towards a location 51 on the table 32. As the camera of the portable device 10 captures an image stream of the table 32, this image stream is augmented with a virtual character 34 so as to generate an augmented reality image stream. This augmented reality image stream is displayed on a display of the portable device 10.

A view 54 of the augmented reality image stream is shown when the portable device 10 is positioned at location 50 and oriented towards location 51. The virtual character 34 is generated and configured so as to appear as if it were positioned at the location 51 in the augmented reality image stream. Thus, the virtual character appears to be standing on the table 32 in the augmented reality image stream. Additionally, the virtual character 34 is configured to exhibit an awareness of the position of the portable device 10, and in this case, exhibits such awareness by looking at the portable device 34.

However, the virtual character 34 may also be configured to exhibit awareness of the direction in which the portable device 10 is oriented. In accordance with one embodiment as shown, the virtual character 34 may be configured so as to look in the direction that the camera of the portable device 10 is aimed. As illustrated with continued reference to FIG. 5, when the camera is positioned at location 52 and oriented so as to have its camera directed towards location 53, then the virtual character 34 is configured to also appear to look in the same direction (i.e. towards location 53) in the augmented reality stream. This is illustrated by the corresponding view 55 of the augmented reality stream, in which the virtual character 34 has turned to face the direction that the portable device is directed towards. In this manner, the virtual character 34 can be configured to demonstrate not only awareness of the position of the portable device, but also its orientation, thus providing a user with an enhanced interactive experience with the virtual character. The virtual character may look at the user when the user looks at the virtual character (i.e. directs camera of the portable device towards the virtual character's "position" in the real environment), and look in the direction that the user looks when the user looks away from the virtual character (i.e. directs the camera of the portable device away from the virtual character's "position" in the real environment).

Figure 5B:
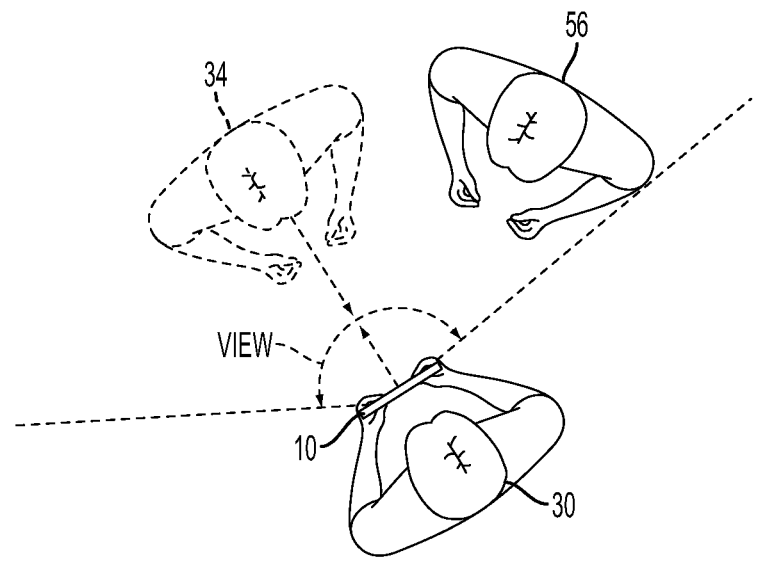
FIGS. 5B and 5C illustrate overhead views of a user interacting with a virtual character and a real person, in accordance with an embodiment of the invention.
Figure 5C:
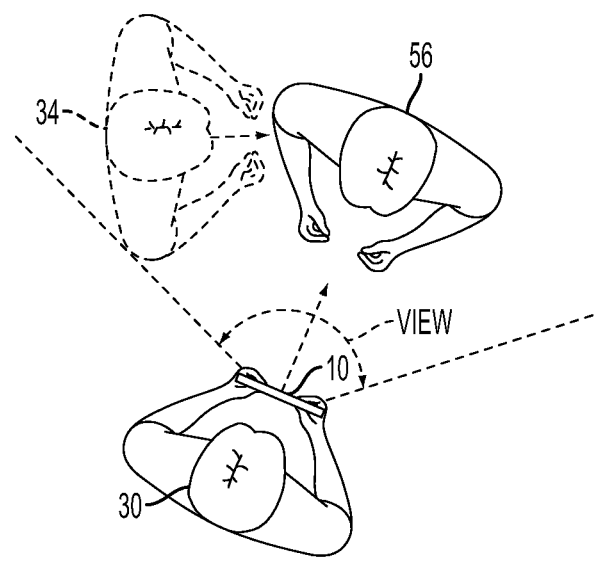

With reference to FIGS. 5B and 5C, overhead views of a user interacting with a virtual character and a real person are shown, in accordance with an embodiment of the invention. As shown, at FIG. 5B, the user 30 holds portable device 10, such that its camera is directed to an area adjacent to a third-party real person 56. A virtual character 34 is configured to be located in this area, and thus the user 30 views the virtual character 34 on a display of the portable device 10. The virtual character 34 is configured to exhibit an awareness of the user's 30 position or activity, and thus, in the embodiment illustrated, the virtual character 34 looks in the direction of the portable device 10, thereby appearing to the user 30 to be looking at the user. At FIG. 5C, the user 30 directs the portable device 10 towards the real person 56. The virtual character 34 is configured to react to the activity of the user 30, and in this instance, the virtual character 34 is configured to look in the direction of an object towards which the portable device 10 is oriented, in other words towards the real person 56.

Figure 6:
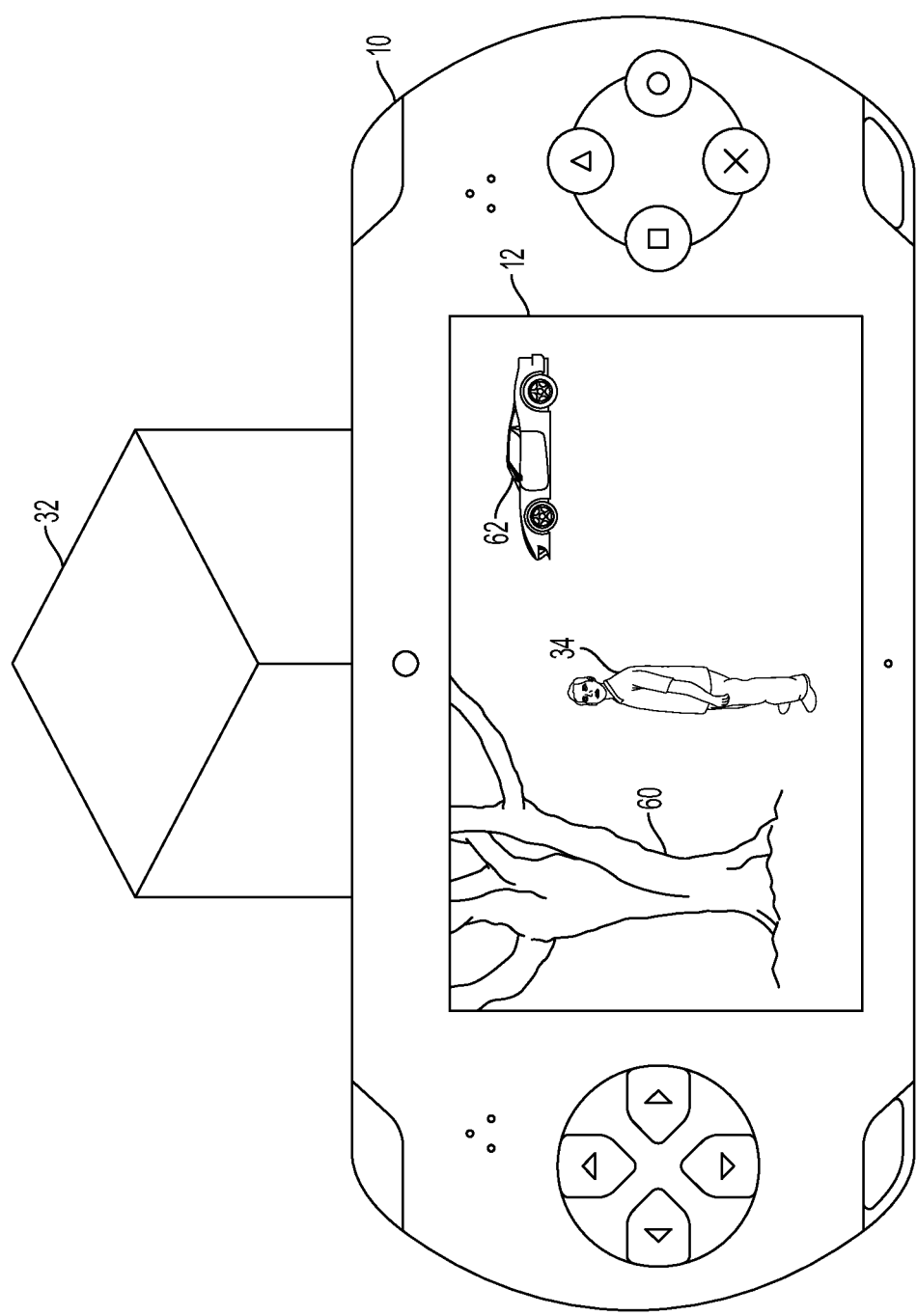
FIG. 6 illustrates a close-up view of a portable device being used to display an augmented reality image stream, as viewed from the perspective of a user, in accordance with an embodiment of the invention.

With reference to FIG. 6, a close-up view of a portable device 10 being used to display an augmented reality image stream is shown, as viewed from the perspective of a user, in accordance with an embodiment of the invention. The portable device 10 includes a camera which is used to capture an image stream of table 32, which is depicted in the background at FIG. 6. The captured image stream is augmented with a virtual character 34 so as to form an augmented reality image stream. In one embodiment, the virtual character 34 is configured to demonstrate awareness of the location of the portable device 10 or the user. This may be accomplished by, for example, configuring the virtual character 34 to look or move in the direction of the portable device 10.

Additionally, the augmented reality image stream may include additional virtual elements such as a tree 60 and vehicle 62. In embodiments of the invention, the augmented reality image stream may include any kind of virtual element, the virtual elements being added to the captured image stream so as to form the augmented reality image stream. In some embodiments, the virtual elements may be generated with reference to particular locations or objects in the real environment, or may be configured to interact with objects in the real environment. In other embodiments, virtual elements may exist independently of objects in the real environment. In some embodiments, virtual elements may move and interact with objects in the real environment. In other embodiments, virtual elements may be situated at fixed locations within the real environment. In some embodiments, virtual elements may replace objects within the real environment.

In various embodiments of the invention, any number of the real world elements captured in the image stream upon which the augmented reality image stream is based may be replaced by virtual elements, including total replacement of the real world image stream with virtual elements. The augmented reality image stream may have any mix or relative proportion of real world elements and virtual elements.

While embodiments of the invention are generally described in terms of an augmented reality scene which is generated based on a captured image stream of a real world scene, it is recognized that the principles of the present invention may also be applied to a virtual reality scene (no real world elements visible) having a virtual reality character. With continued reference to FIG. 6, in an alternative embodiment of the invention, a virtual reality image stream is displayed on the display 12. The virtual reality image stream is generated with reference to the real world scene that is captured in accordance with the principles discussed above. And the location and orientation of the portable device 10 can be determined based on analysis of the real world image stream and other sensors as previously discussed. However, the video displayed to the user may consist exclusively of a virtual environment that is positioned with reference to the real world environment. In this manner, a user views the virtual world via the portable device, yet the virtual world is positionally tied to the real world, so that the user may maneuver the portable device 10 about the virtual world in a natural manner. It will be understood by those skilled in the art that the principles of the present invention may be applied to embodiments in which a virtual reality scene is displayed to a user on the portable device 10, without departing from the scope of the present invention.

Figure 7:
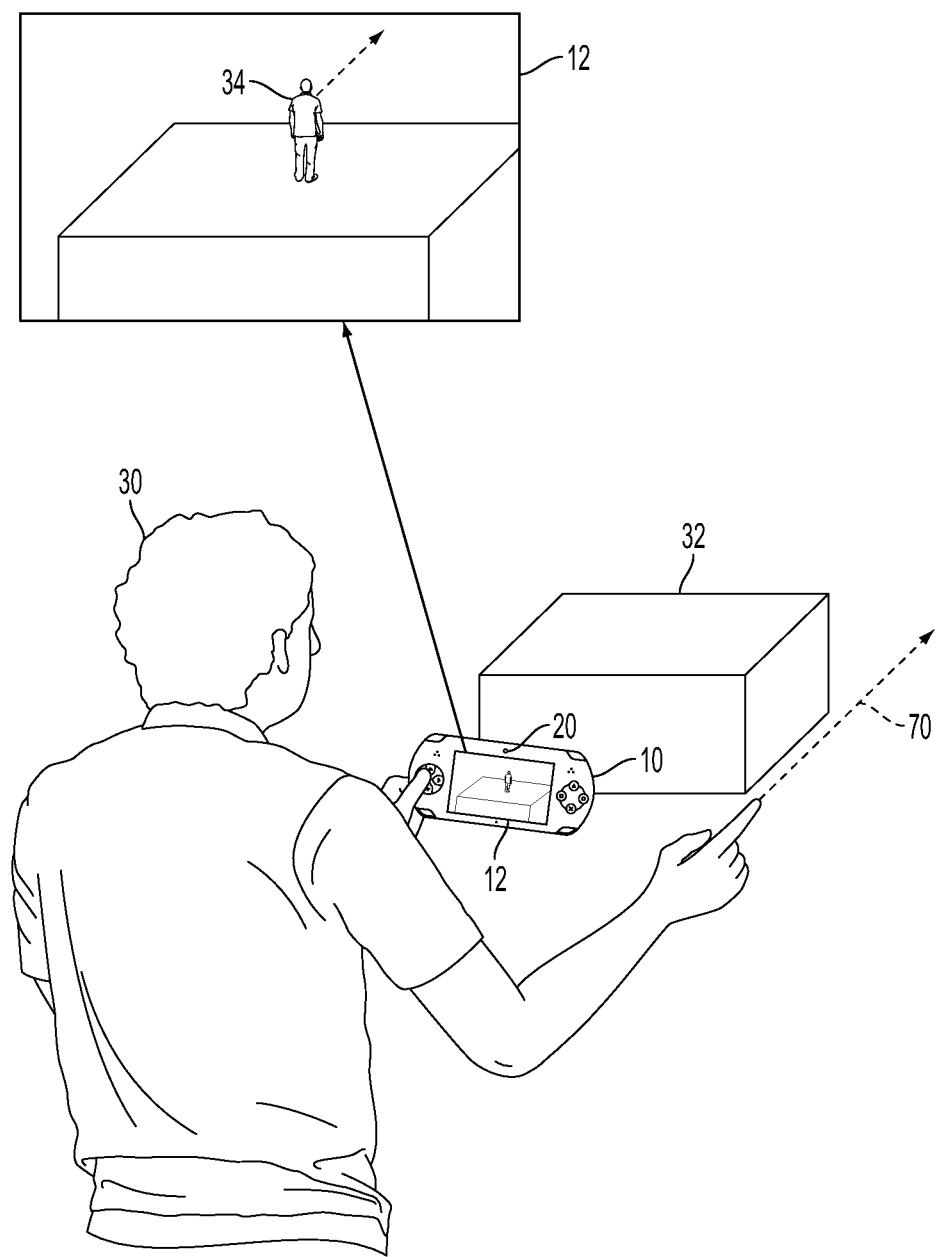
FIG. 7 illustrates a user utilizing a portable device to view an augmented reality scene, in accordance with an embodiment of the invention.

With reference to FIG. 7, a user 30 is shown utilizing a portable device 10 to view an augmented reality scene, in accordance with an embodiment of the invention. The portable device 10 includes a rear-facing camera (not shown) which captures an image stream including the table 32. The captured image stream is augmented with a virtual character 34, so as to form an augmented reality image stream that is displayed on display 12 of the portable device 10. Additionally, the portable device 10 includes a front-facing camera 20, which captures an image stream of the user 10. This user image stream may be analyzed in real-time to determine various parameters related to the user and to provide additional modes of functionality and interactivity to the user.

For example, in one embodiment the user image stream may be analyzed to determine a more accurate position of the user (as opposed to approximating the position of the user based only on the position of the portable device 10). Or in another embodiment, the user image stream is analyzed to determine facial expressions of the user. In one embodiment, the direction that the user is facing and/or the movement of the user's eyes are tracked through analysis of the user image stream, so as to determine where the user is looking or facing. In another embodiment, the user image stream can be analyzed to determine gestures of the user, such as pointing, waving, etc. In still other embodiments of the invention, physical attributes related to and of the user can be determined, such as eye color, skin type, clothing color, etc. In various other embodiments of the invention, any of various kinds of expressions, movements, positions, or other qualities of the user can be determined based on analysis of the user image stream, without departing from the scope of the present invention.

The virtual character 34 may be configured to demonstrate awareness of the various qualities which are determined from analysis of the user image stream, as described above. For example, based on a more accurately determined location of the user 30, the virtual character 34 might be configured to demonstrate awareness of the user's position by, for example, looking or moving in the direction of the user 30. In another embodiment, the virtual character may be configured to look in the direction in which the user 30 is determined to be looking, based at least in part on analysis of the user image stream.

In one embodiment, the virtual character 34 is configured to react to facial expressions of the user. For example, the virtual character 34 might provide appropriate responses to various expressions of the user 30, such as demonstrating excitement when the user expresses happiness. In one embodiment, the virtual character 34 is configured to respond to expressions of the user 30 by demonstrating similar types of expressions. For example, the virtual character 34 may be configured to wave when the user 30 waves in the direction of the virtual character. The virtual character 34 may exhibit any of various facial expressions and gestures so as to communicate an expression to the user 30 and demonstrate awareness of the user's expressions and gestures.

In one embodiment, the virtual character 34 is configured to demonstrate an awareness of where a user is pointing, as determined based on real-time analysis of the user image stream captured by the front-facing camera 20 of the portable device 10. As shown with continued reference to FIG. 7, the user 30 is pointing in a direction 70. The virtual character 34 may initially be looking at the user 30. The user image stream captured by the front-facing camera 20 is analyzed to determine the direction that the user is pointing. And the virtual character 34 is configured to then react to the user's pointing in the direction 70 by looking in the same direction. In another embodiment, the virtual character may be configured to move in the direction that the user 30 is pointing. In other embodiments of the invention, the virtual character may be configured to perform any type of action in response to the user pointing in a given direction, such as attacking an enemy or firing a weapon in the given direction, or other types of actions.

In another embodiment, the rear-facing camera of the portable device 10 may be utilized to detect gestures of the user 30. For example, with continued reference to FIG. 7, in an alternative embodiment, the user 30 may move their hand behind the portable device 10 so as to be captured by the portable device's 10 rear-facing camera. Thus, the user's hand is included in the image stream captured by the rear-facing camera. This image stream is analyzed to detect the presence of the user's hand as well as interpret any gestures being made by the user's hand. For example, the user's hand may be gesturing in a particular manner, such as pointing, waving, moving side-to-side, beckoning, grasping, etc. These gestures are detected and may be utilized to affect virtual objects in the augmented reality image stream. The virtual character may respond to such gestures in a manner indicating awareness of the user's activity.

While the foregoing examples are described with reference to a portable device include a front-facing and rear-facing cameras, it will be apparent to those skilled in the art that the portable device may include any number of cameras having various orientations for detecting actions and gestures of the user, as well as capturing image streams of the real environment.

Figure 8:
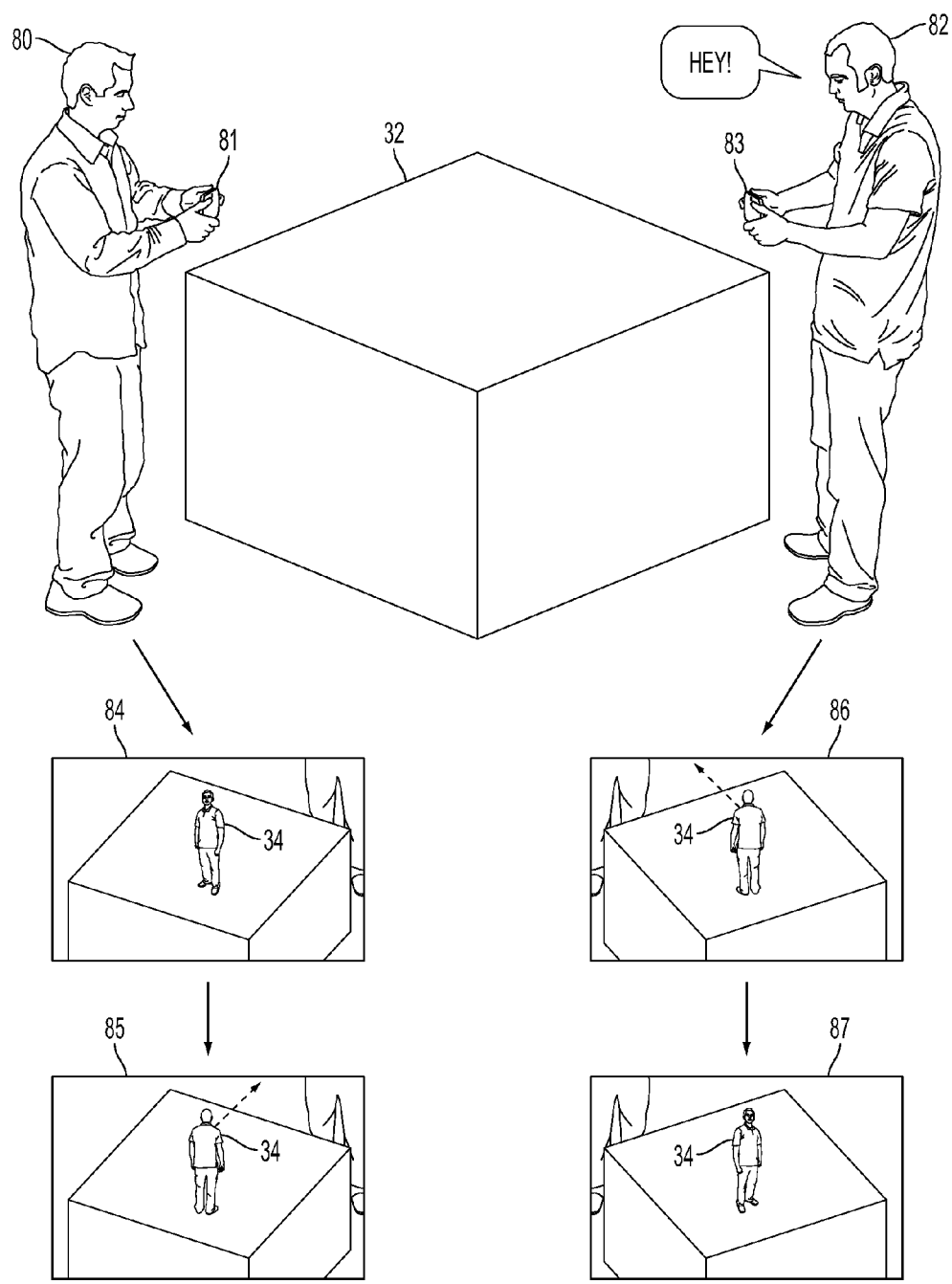
FIG. 8 illustrates two users utilizing portable devices to view an augmented reality scene, in accordance with an embodiment of the invention.

With reference to FIG. 8, two users are shown utilizing portable devices to view an augmented reality scene, in accordance with an embodiment of the invention. As shown, a user 80 holds a portable device 81, and a user 82 holds a portable device 83. The user 80 and user 82 stand on opposite sides of a table 32, with their respective portable devices directed towards the table. Each of the portable devices 81 and 83 includes a camera which captures an image stream of the real environment including the table and surrounding area which is in the field of view of the camera. Each of these captured image streams is augmented with the same virtual character 34, so as to form parallel augmented reality image streams. The portable devices 81 and 83 are linked to each other, either directly (e.g. via a wireless connection) or indirectly (e.g. via a supplemental device, such as a computer, gaming system, network device, or some other computing device, etc. (not shown)) such that the same augmented reality scene is shown on each of the portable devices 81 and 83, but from different perspectives in accordance with their respective locations and orientations.

With continued reference to FIG. 8, a view 84 of the augmented reality scene as seen by the user 80 on his portable device 81 is illustrated. As shown, the virtual character 34 is looking at the user 80. Simultaneously, the user 82 sees a view 86 on his portable device 83. As shown by the view 86, the virtual character 34 is looking away from the user 82 and towards the user 80. In accordance with an embodiment of the invention, the virtual character 34 may be configured to react to and demonstrate awareness of both the users positions and actions. In the illustrated example, the user 82 makes a noise or speaks. This noise is detected by a microphone of the user's 82 portable device 83. The virtual character 34 is configured to react to the noise by looking in the direction of the noise, i.e. looking in the direction of the portable device 83, and thus demonstrates awareness of the position of the portable device 83, and by extension the position of the user 82. This is illustrated by the view 87, as seen by the user 82, in which the virtual character 34 has now turned to face the user 82. Likewise, the view 85 seen by the user 80 illustrates that the virtual character 34 has turned away from the user 80 and towards the user 82. In this manner, the attention and awareness of the virtual character 34 can be shifted from one user to another user, both of whom are collectively viewing the same augmented reality scene.

While the foregoing example has been described with reference to two users, in other embodiments any number of users can be viewing the same augmented reality environment, and the virtual character can be configured to demonstrate awareness of any of those users' positions and actions. By way of example, the virtual character may demonstrate awareness of the multiple users' positions and actions by looking, moving, speaking, or gesturing in the direction of a given user, or taking any other type of action which demonstrates awareness of the given user's position and/or activity.

Figure 9:
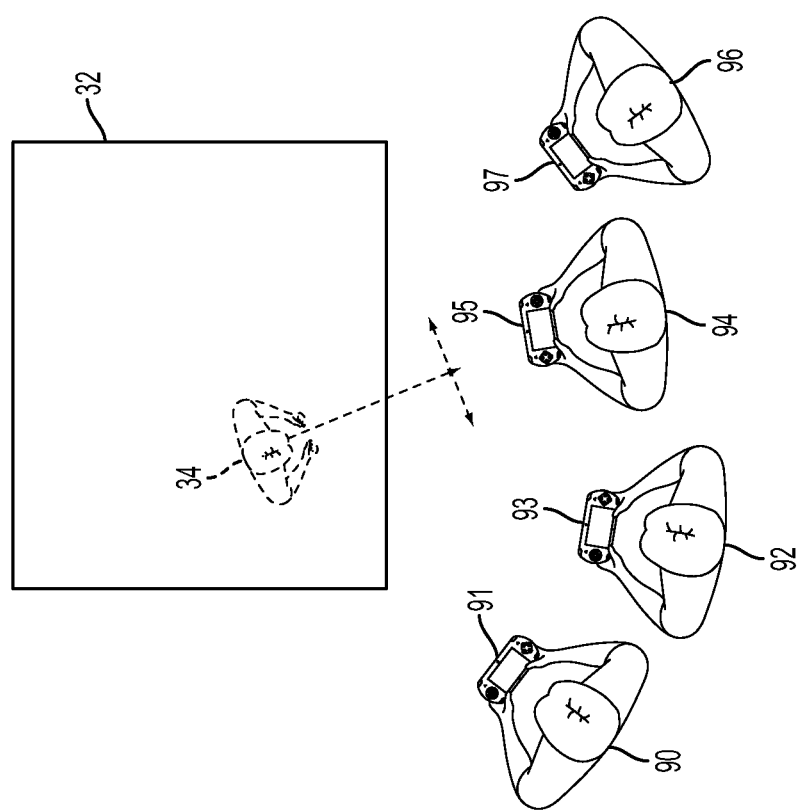
FIG. 9 illustrates an overhead view of a group of users utilizing portable devices to view an augmented reality scene, in accordance with an embodiment of the invention.

With reference to FIG. 9, an overhead view of a group of users utilizing portable devices to view an augmented reality scene is shown, in accordance with an embodiment of the invention. A first user 90 holds a portable device 91; a second user 92 holds a portable device 93; a third user 94 holds a portable device 95; and a fourth user 96 holds a portable device 97. While the specific example shown illustrates four users holding portable devices, it will be appreciated by those skilled in the art that any number of users holding portable devices may be provided for, in accordance with various embodiments of the invention. Each of the portable devices 91, 93, 95 and 97 includes a camera for capturing an image stream of the real environment. In this case, the cameras of the portable devices 91, 93, 95, and 97 are generally oriented towards a table 32. In this manner, the cameras of the portable devices are all oriented towards the same real environment scene, and thus capture image streams of the same scene but from different perspectives depending on the locations and orientations of the portable devices 91, 93, 95, and 97. Each of the captured image streams from each of the portable devices is augmented with the same virtual character 34, so as to form augmented reality image streams from the perspective of each of the portable devices 91, 93, 95, and 97. The virtual character 34 will appear different to each of the users 90, 92, 94, and 96 depending on the perspective from which each of their respective portable devices is being utilized to view the augmented reality scene. To facilitate this, the portable devices 91, 93, 95, and 97 are linked to each other either directly or indirectly via a supplemental device so as to provide collective real-time viewing of the same augmented reality scene from different perspectives at each of the different portable devices. In this manner, each of the users 90, 92, 94, and 96 is able to simultaneously interact with the same augmented reality scene—and more specifically, interact with the same virtual character 34.

It will be appreciated that the virtual character 34 may be configured to react to and interact with the multiple users 90, 92, 94, and 96 in various ways which demonstrate awareness of the users' positions. For example, the virtual character 34 may be configured to direct its attention towards one of the users by looking or moving in the direction of the user. In one embodiment, this may occur based on a detected motion or sound of one of the users. The motion or sound of a user may be captured by a microphone and camera of the user's portable device, configured to detect images and sounds from that particular user. As an example, the virtual character 34 might be looking towards one of the users. Another one of the users may wave his hand, say something, or provide some other gesture so as to get the attention of the virtual character 34. This gesture or sound is detected by the user's portable device, and the virtual character 34 may then turn towards that user in response to the gesture or sound.

In various other embodiments of the invention, the virtual character 34 may be configured to take any kind of action, either of its own accord, or in response to some kind of input received from one or more of the users, which demonstrates awareness of the position of the portable devices and/or the users holding them. For example, in one embodiment, the virtual character 34 might look from one user to another user in a systematic fashion. Or in another embodiment, the virtual character 34 might look at the same user until its attention is drawn away from that user and towards another user because of an action performed by the latter user. In addition to looking or moving in the direction of a given user, the virtual character 34 might also demonstrate awareness of a user's position by talking in the direction of the user and/or their portable device, changing a facial expression, moving its eyes, throwing an object, firing a weapon, or any other type of action so as to demonstrate an awareness of the position of the user.

The foregoing embodiments have been generically described with reference to one virtual character. However, in other embodiments of the invention, there may be any number of virtual characters, each of which may demonstrate awareness of the positions of any of various users who are viewing the augmented reality scene via a portable device as herein described.

Those skilled in the art will realize numerous possible applications without departing from the scope of the present invention. By way of example only, and not by way of limitation, some possible applications are discussed herein. For example, in one embodiment, a virtual character presented as part of an augmented reality scene may be configured to act as a performer that interacts with any of various users viewing the same augmented reality scene with respective portable devices. Such interactions might involve looking in the direction of a user, gesturing towards a user, or other types of actions indicating awareness of the user's position. In this manner, a group of users may watch the same performance by a virtual character from different perspectives, with enhanced interactivity provided by the virtual character's apparent awareness of each of the users' positions.

In other related embodiments, there may be several virtual characters that are each configured to act as performers.

Such a group of virtual characters might be configured to behave in a coordinated fashion, such as in a musical group, dance group, acrobatic group, etc. Or such a group of virtual characters might be configured to behave in a less coordinated fashion, or in such a manner that each of the virtual characters behaves in an independent manner. Each of the group of virtual characters could demonstrate awareness of one or more of the various users who are viewing the augmented reality scene via their respective portable devices.

Those skilled in the art will realize numerous variations in accordance with the presently described embodiments without departing from the scope of the present invention. For example, in one embodiment, the foregoing principles may be applied so as to simulate an environment wherein multiple users view one or more performers, wherein each performer may demonstrate awareness of the users' positions. In another embodiment, multiple users could collectively view a virtual lecturer, or a virtual panel discussion, or the like, wherein each of the virtual characters demonstrates awareness of the users' positions. In another embodiment, multiple users might collectively participate in a game and collectively view a virtual game host, the virtual game host interacting with the users in such a manner as to demonstrate awareness of the users' positions. In other embodiments a virtual character could be an animal, pet, animation-based character, human-based character, alien, or any other type of character that demonstrates awareness of users' positions.

Figure 10:
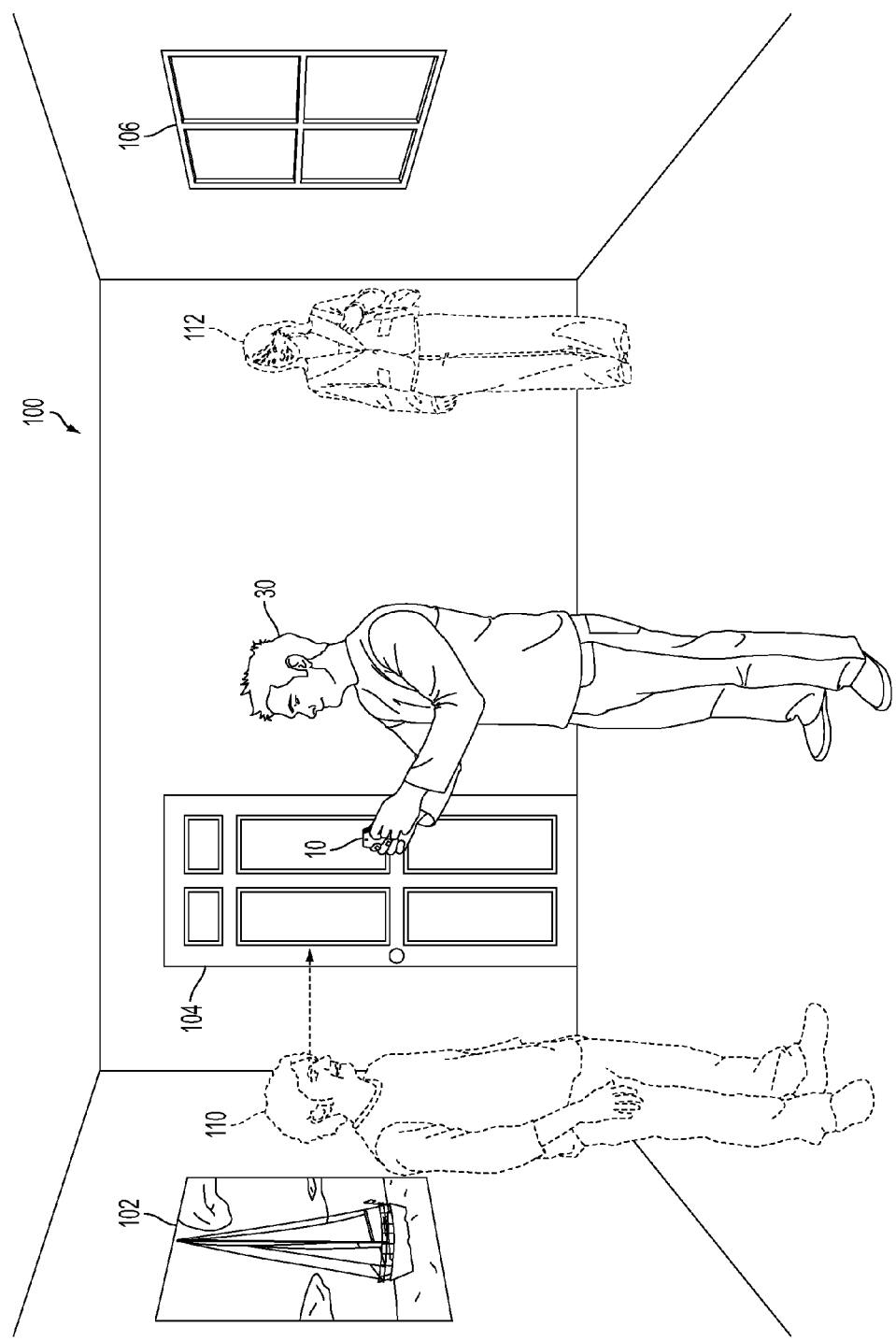
FIG. 10 illustrates a view of a room, in which a user is using a portable device to view an augmented reality scene, in accordance with an embodiment of the invention.

With reference to FIG. 10, a view of a room 100 is shown, in which a user 30 is using a portable device 10 to view an augmented reality scene, in accordance with an embodiment of the invention. As shown, the room 100 contains various elements and features, such as a picture 102, a door 104 and a window 106. These and other features are captured in an image stream by a camera of the portable device 10. The captured image stream is analyzed so as to enable a determination of the position and orientation of the portable device 10, and to enable tracking of the portable device's movements as it is maneuvered by the user 30. The determination of the position, orientation, and movement of the portable device 10 may be enhanced by the use of onboard devices included in the portable device 10, such as an accelerometer, magnetometer, and/or gyroscope.

The captured image stream of the real environment of the room 100 is augmented in real-time with a virtual character 110. As shown, the virtual character 110 is configured to demonstrate an awareness of the user's 30 position by, for example, looking, facing, gesturing, or moving in the direction of the portable device 10. Additionally, the augmented reality scene may be configured to have other virtual characters, such as virtual character 112. Thus, in the example shown at FIG. 10, when the user 30 turns the portable device 10 to her right, the augmented reality image stream displayed on the portable device 10 will include an image of the virtual character 112. This virtual character 112 may also demonstrate awareness of the user's 30 position by, for example, looking, facing, gesturing, or moving in the direction of the portable device 10. In this manner, the user 30 may experience and interact with an augmented reality environment containing multiple virtual characters that demonstrate awareness of the user's position. As the user moves about a given real environment, one or more of the virtual characters in the augmented reality scene may interact with the user in a manner demonstrating awareness of the user's position, and may track the movement of the user as she moves within the real environment.

Figure 11:
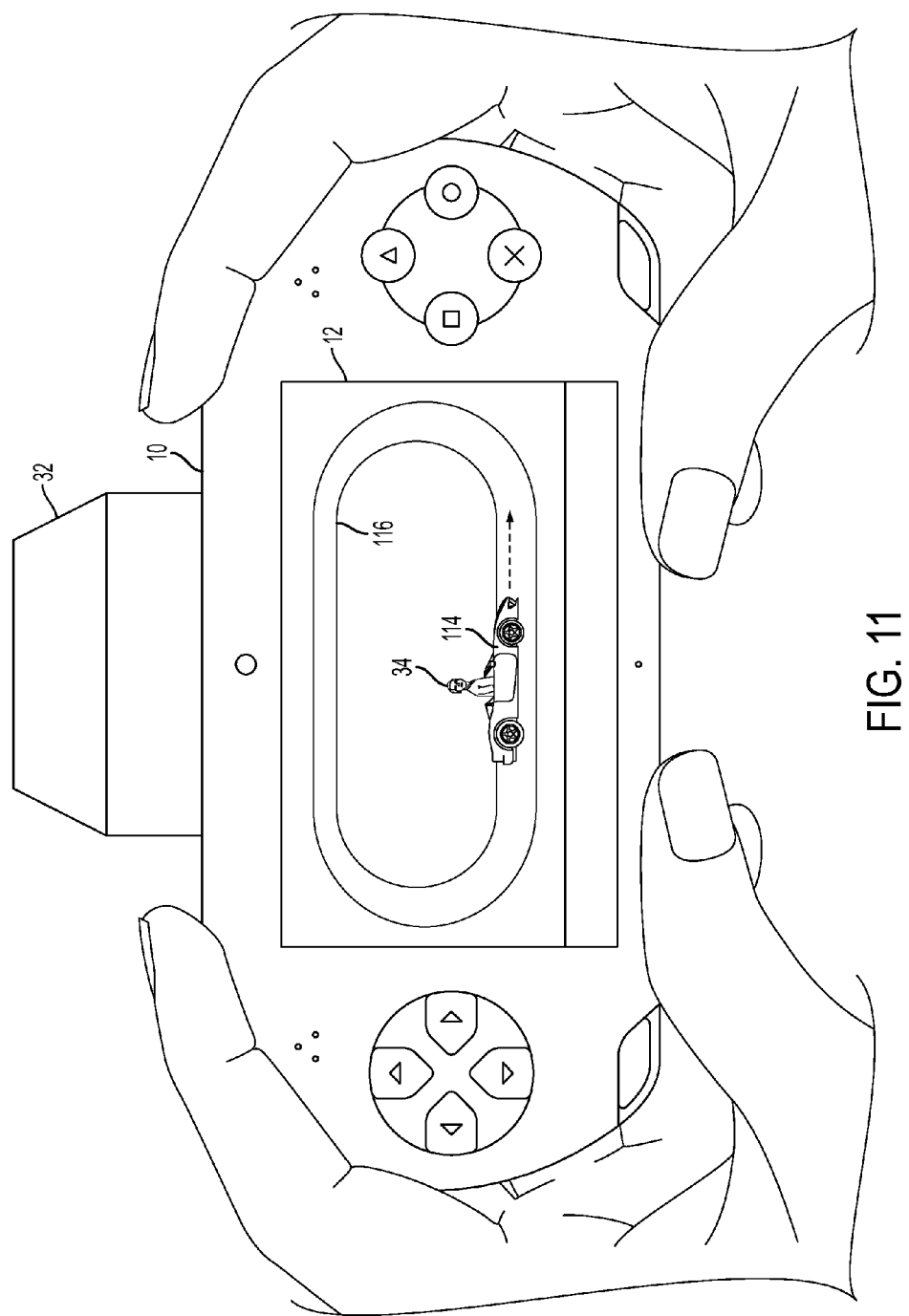
FIG. 11 illustrates a close-up view of a portable device, as viewed from the perspective of a user interacting with a virtual character, in accordance with an embodiment of the invention.

With reference to FIG. 11, a close-up view of a portable device 10 is shown, as viewed from the perspective of a user interacting with a virtual character 34, in accordance with an embodiment of the invention. In the illustrated embodiment, the portable device 10 includes a camera which captures an image stream including the table 32, shown in the background. The captured image stream is augmented with various elements so as to produce an augmented reality image stream, which is displayed on the display 12 of the portable device 10. As shown, the augmented reality image stream includes a virtual track 116, and the virtual character 34 is configured to drive a virtual vehicle 114 on the virtual track 116. The virtual character 34 is configured to demonstrate awareness of the user's position. Thus, in one embodiment, when the virtual character 34 drives the virtual vehicle 114 towards the user or closer to the user along the virtual track 116, the virtual character 34 may look in the direction of the user. Whereas, when the virtual character 34 drives the virtual vehicle 114 away from the user or is farther from the user along the virtual track 116, then the virtual character 34 may not look in the direction of the user. In various other embodiments, the virtual character 34 may demonstrate awareness of the user's position by performing other actions, such as driving at a different speed (e.g. slowing down), making a facial expression, etc.

As noted above, in an alternative embodiment, a virtual reality environment (as opposed to an augmented reality environment) can be generated based on the captured image stream of the real environment. In such an embodiment, the virtual elements of the virtual reality image stream are positioned with reference to elements of the real environment, the elements of the real environment being detected based on analysis of the captured image stream of the real environment. For example, as shown of FIG. 11, the virtual track 116, virtual vehicle 114, and virtual character 34 are positioned with reference to elements of the real environment, such as the table 32. A virtual reality image stream which depicts the virtual reality environment is generated and displayed on the display 12 of the portable device 10. The user thus views a virtual reality scene rather than the real-world scene on the portable device 10, but is able to move the portable device 10 to different positions within the virtual environment by physically maneuvering the portable device 10, as the virtual environment is positioned with reference to the real environment which is being continuously captured by the portable device's camera.

In various embodiments of the invention, there may be different levels of awareness of a user's position demonstrated by a virtual character. For example, in some embodiments, the quality of a particular action of the virtual character which demonstrates awareness may be variable. For example, the percentage of time that a virtual character looks at a user in such a manner as to demonstrate awareness of the user's position may vary. Or the extent to which a virtual character moves in a user's direction may vary. In other embodiments, any quality associated with an action demonstrating awareness of a user's position may be variable so as to provide different levels of awareness exhibited by the virtual character.

Additionally, different levels of awareness may be defined by various combinations of activities which demonstrate awareness of a user's position. For example, one level of awareness may be defined by the virtual character looking in the direction of the user. Whereas, another level of awareness may be defined by a combination of the virtual character looking in the direction of the user as well as moving in the direction of the user. It will be appreciated by those skilled in the art that in various embodiments of the invention, any of various combinations of actions indicating awareness of a user's position may be used to define different levels of awareness. Furthermore, both a quality of an action demonstrating awareness, and combinations of such actions may be integrated in order to define various levels of awareness of a user's position which may be exhibited by a virtual character.

While the various levels of awareness have been described with reference to the performance of particular actions, it will be appreciated that levels of awareness may also indicate variations in the ability to take a particular action which may indicate awareness of the user's position, regardless of whether the particular action is actually performed by the virtual character or not. Thus, for example, one level of awareness might be defined by the virtual character having the ability to look in the direction of the user. However, the performance of the virtual character actually looking in the direction of the user might not occur unless triggered by an activity of the user, such as a movement, gesture, sound, or other activity. In various embodiments of the invention, a level of awareness can be defined for a virtual character by the ability to perform a given action indicating awareness of the user's position, regardless of whether the given action is actually performed or not.

The level of awareness of a user's position demonstrated by a virtual character may change over time. This change in the awareness level may be caused by specific actions of the user, or may occur to varying degrees of dependence or independence from actions of the user. In some embodiments, the changes in awareness level over time are discreet. In other embodiments, the changes in awareness level over time are continuous. In still other embodiments, the changes in awareness level over time may exhibit a combination of discreet and continuous changes.

Figure 12A:
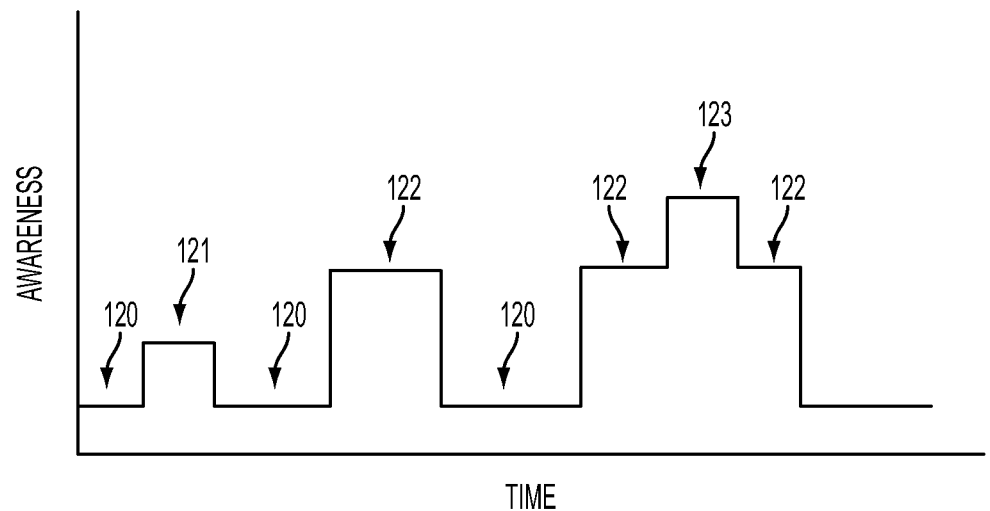
FIG. 12A illustrates a graph of awareness versus time, in accordance with an embodiment of the invention.

With reference to FIG. 12A, a graph of awareness versus time is shown, illustrating discreet changes in awareness of a virtual character over time, in accordance with an embodiment of the invention. As shown, the regions 120 of the graph illustrate a base level of awareness. This base level of awareness may in fact indicate that the virtual character will exhibit no awareness of the user's position, or that the virtual character exhibits a minimal amount of awareness of the user's position. At region 121, the virtual character exhibits a first level of awareness of the user's position. At regions 122, the virtual character exhibits a second level of awareness of the user's position. And at region 123, the virtual character exhibits a third level of awareness of the user's position. In one embodiment, first, second and third levels of awareness define increasing levels of awareness of the user's position exhibited by the virtual character. For example, a first level might be defined by the virtual character looking in the direction of the user. A second level might additionally include the virtual character moving in the direction of the user. And a third level might further include the virtual character gesturing in the direction of the user. In various embodiments of the invention, any particular level of awareness may be defined by an action or combination of actions, or ability to take such actions, which demonstrate awareness of the user's position. The various actions and/or abilities defined by the levels of awareness may be additive or cumulative for increasing levels in some embodiments, or may be different for different levels in other embodiments.

Figure 12B:
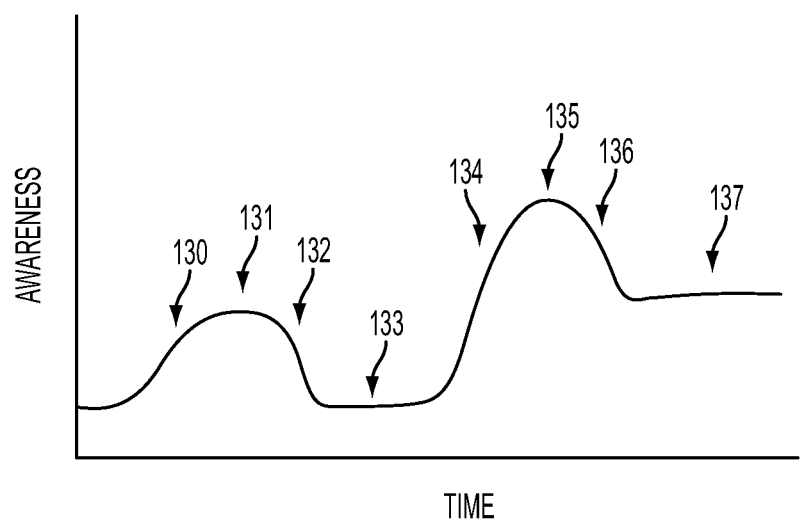
FIG. 12B illustrates a graph of awareness versus time, in accordance with an embodiment of the invention.

With reference to FIG. 12B, a graph of awareness versus time is shown, illustrating changes in the level of awareness of a user exhibited by a virtual character, in accordance with an embodiment of the invention. As shown, the level of awareness demonstrated by the virtual character changes in a continuous manner, with various regions of time in which the level of awareness changes or maintains a steady state. For example, at regions 130 and 134 the level of awareness of the virtual character is increasing. At regions 131 and 135, the level of awareness of the virtual character peaks, and at regions 132 and 136, the level of awareness of the virtual character is decreasing. At regions 133 and 137, the level of awareness of the virtual character maintains a constant state.

The foregoing illustrated embodiments are provided by way of example only, and not by way of limitation. In various embodiments of the invention, the level of awareness exhibited by the virtual character may vary between any number of levels. The level of awareness may be continuously changing, exhibit time periods of constant levels of awareness, exhibit a mixture of continuous and discreet changes, etc. In some embodiments, the virtual character may exhibit periodic changes in the level of awareness of a user which is exhibited. For example, the virtual character may be configured to exhibit oscillatory changes between different levels of awareness. Or in other embodiment, the virtual character may exhibit other types of changes that occur in a periodic fashion.

Furthermore, the level of awareness or change in such level may be tied to various aspects of the user experience. For example, if the user is playing a game, then the level of awareness exhibited by the virtual character may change depending on the stage of the gameplay, or in response to an action, selection, or some other activity of the user. Thus by way of example, in one embodiment, during one phase or stage of a game, the virtual character exhibits a certain level of awareness of the user, while during another phase or stage of the game, the virtual character exhibits a different level of awareness. Examples of changes in a phase or stage of gameplay might include such transitions as movement of the virtual character into a particular area, completion of an objective, advancement to a new level of the game, beginning a new task, equipping the virtual character with a particular device/item/weapon/etc., or any other kind of change in the gameplay that may be configured to cause a change in the level of awareness of the user exhibited by the virtual character. The transition from one level of awareness to another may be discreet or continuous.

In some embodiments, the level of awareness may be determined based on an activity in which the virtual character is engaged. Thus, in one activity, the virtual character may exhibit a certain level of awareness, while for another activity, the virtual character may exhibit a different level of awareness. In one embodiment, an awareness profile may be provided for a given activity, location, stage or other determinant of awareness, the awareness profile indicating levels of awareness and changes in the level of awareness associated with various inputs or changes in parameters associated with the virtual character. For example, in one embodiment, when the virtual character is located in a given area, then a corresponding awareness profile might specify that the level of awareness of the user exhibited by the virtual character may have a certain range. Whereas, when the virtual character is located in a different area, the corresponding awareness profile for that area might specify a different range from the level of awareness exhibited by the virtual character. This is merely one example of an implementation of an awareness profile, and it will be understood by those skilled in the art that in other embodiments of the invention, an awareness profile may be applied to any of various kinds of parameters associated with the virtual character or the user, such as location, activity, level, stage, input, etc.

Figure 12C:
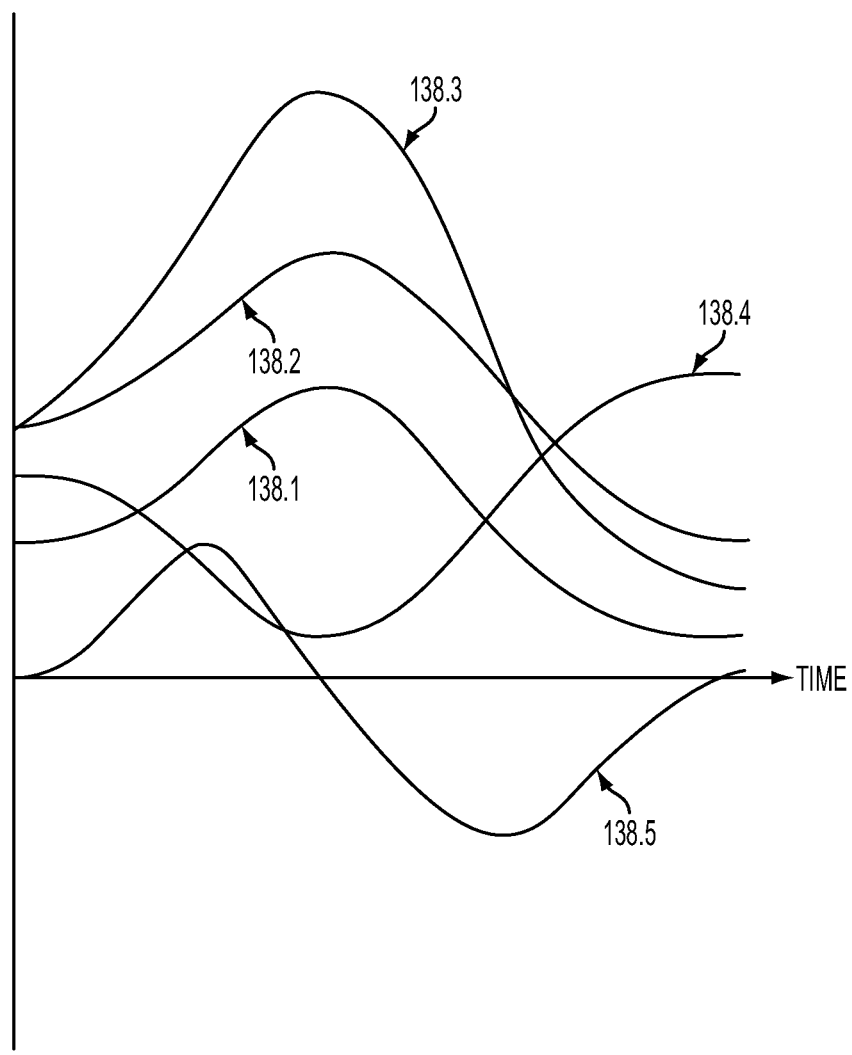
FIG. 12C illustrates a graph of awareness versus time, in accordance with an embodiment of the invention.

With reference to FIG. 12C, a graph illustrating awareness versus time is shown, in accordance with an embodiment of the invention. A curve 138.1 illustrates the level of awareness of a user exhibited by a virtual character over time. In various embodiments of the invention, the awareness of a virtual character as it is monitored over time can be utilized to effect changes in other aspects of a user's experience with an augmented reality environment. For example, an audio volume level might be related to the level of awareness. In one embodiment, the audio volume may be configured to increase as the level of awareness increases. Or the audio volume level of a specific portion of the augmented reality, such as the region containing the virtual character, might be configured to be related to the level of awareness. In another embodiment, the zoom level may be related to the level of awareness. For example, in one embodiment, when the level of awareness increases, then the user's view of the augmented reality scene may zoom in on the virtual character.

In still other embodiments, various other aspects of the user's experience of the augmented reality scene might be affected by the changes in the level of awareness exhibited by the virtual character. For example, in some embodiments, a color scheme of the augmented reality scene may be affected by the level of awareness. In one embodiment, the level of color saturation of the augmented reality scene or of the virtual character is related to the level of awareness exhibited by the virtual character. For example, color saturation may increase as level of awareness increases. Or in another embodiment, color saturation of regions surrounding the virtual character might be configured to decrease as the level of awareness increases, thus accentuating the visual display of the virtual character within the augmented reality scene. The foregoing example of aspects of the user's experience of the augmented reality scene which can be affected by the level of awareness are provided by way of example only, and not by way of limitation. In other embodiments of the invention, any aspect of the user's experience of the augmented reality scene may be configured to change based on changes in the level of awareness.

In various embodiments, the relationship between an aspect of the augmented reality scene which is affected by the level of awareness, and the level of awareness may have any kind of relationship. With continued reference to FIG. 12C, curves 138.2, 138.3, 138.4, and 138.5 illustrate curves for controlling an aspect of the augmented reality scene based on the level of awareness. For example, an aspect of the augmented reality scene may be directly or linearly correlated to the level of awareness. Curve 138.2 illustrates such an embodiment, the curve 138.2 being generated by adding a constant to the level of awareness curve 138.1. Curve 138.3 also illustrates such a relationship, the curve 138.3 being generated by multiplying the level of awareness curve 138.1 by a constant. In other embodiments, the relationship of the aspect of the augmented reality to be controlled is inverse to the level of awareness. Curve 138.4 illustrates such an embodiment, the curve 138.4 representing an inverse of curve 138.1.

In other embodiments of the invention, other types of relationships may be utilized to control an aspect of the augmented reality experience based on the level of awareness exhibited by a virtual character. For example, an aspect of the augmented reality experience might be controlled according to a first-order derivative of the level of awareness curve. Curve 138.5 illustrates a first-order derivative of the level of awareness curve 138.1. In one embodiment, the first-order derivative is directly utilized to control an aspect of the augmented reality experience. In another embodiment, the first-order derivative may be used in a predictive manner, to anticipate a future level of awareness, and adjust an aspect of the augmented reality experience accordingly. The foregoing examples of types of relationships between an aspect of the augmented reality scene and the level of awareness are provided by way of example only, and not by way of limitation. In other embodiments of the invention, the relationship may be any type of relationship according to which an aspect of the augmented reality scene is controlled based on the level of awareness.

Figure 13A:
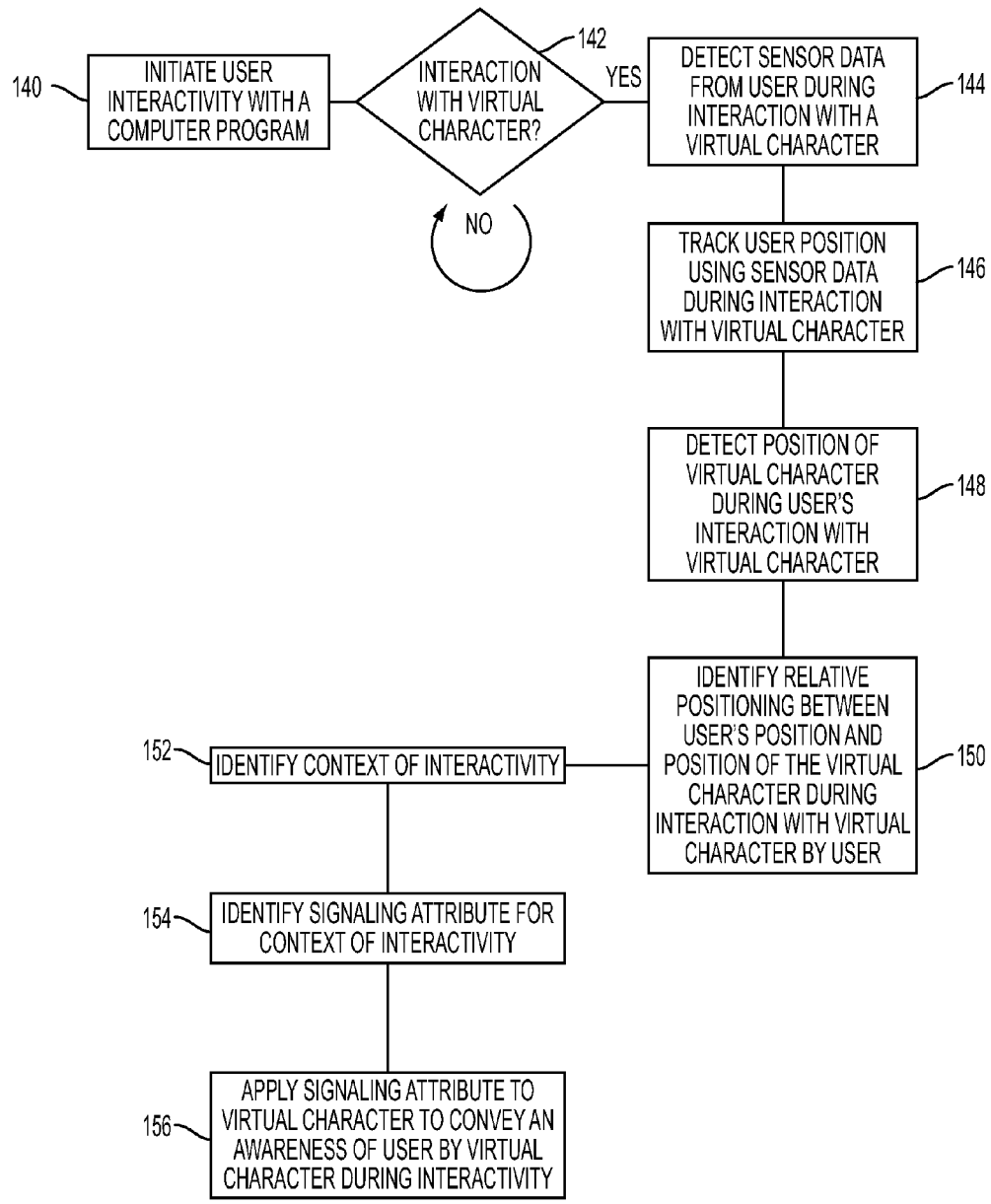
FIG. 13A illustrates a method for causing a virtual character to convey awareness of a user, in accordance with an embodiment of the invention.

With reference to FIG. 13A, a method for causing a virtual character to convey an awareness of a user is shown, in accordance with an embodiment of the invention. At method operation 140, user interactivity with a computer program is initiated. The computer program is configured to receive a captured image stream of a real environment taken by a camera of a portable device that is held or otherwise attached or associated with the user, and generate an augmented reality image stream, wherein the augmented reality image stream includes a virtual character. The augmented reality image stream is displayed to the user on the portable device. At method operation 142, a determination is made as to whether or not the user is interacting with the virtual character. If it is determined that there is no interaction with the virtual character, then the method either halts or continues to check for such interaction until it is determined that the user is interacting with the virtual character.

If it is determined that the user is interacting with the virtual character, then the method proceeds to method operation 144, in which sensor data from the user is detected during the user's interaction with the virtual character. The sensor data may include any of various kinds of data which are useful for determining the position, orientation, and changes thereof, of the user and/or the portable device. For example, the sensor data may include a captured image stream taken by the camera of the portable device, data from motion sensing hardware such as an accelerometer, magnetometer, or gyroscope, and data from other types of sensors which are useful for tracking the position of the user. At method operation 146, the detected sensor data is used to track the position of the user during interaction with the virtual character. At method operation 148, the position of the virtual character is detected during the user's interaction with the virtual character. And at method operation 150, the relative positioning between the user's position and the position of the virtual character during the interaction with the character by the user is identified.

At method operation 152, the context of the interactivity is identified. The identified context of the interactivity may include any of various features and attributes relating to the context in which the user interacts with the virtual character. For example, the context may include such attributes as the time of day, the location of the virtual character, a setting of the interaction such as a phase or stage of gameplay, the presence or absence of items both real and virtual, etc. At method operation 154, a signaling attribute is identified for the context of interactivity. At method operation 156, the signaling attribute is applied to the virtual character to convey an awareness of the user by the virtual character during interactivity.

Figure 13B:
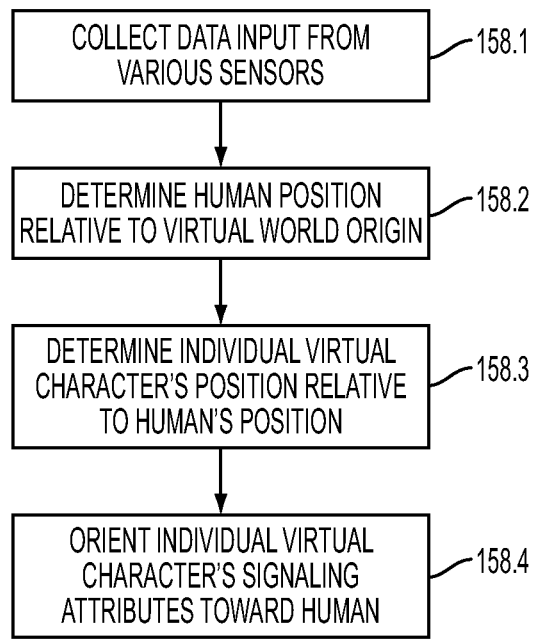
FIG. 13B illustrates a flow chart illustrating a method for a virtual character to demonstrate that the virtual character knows where a human is in his world, in accordance with an embodiment of the invention.

With reference to FIG. 13B, a flow chart illustrating a method for a virtual character to demonstrate that the virtual character knows where a human is in his world is shown, in accordance with an embodiment of the invention. According to the method, the virtual character through use of various sensors determines where the human is relative to itself. As the human physically moves around the virtual character, the virtual character performs various acts that demonstrate that the character knows where the human is in his world. At method operation 158.1 data input from various sensors is collected. The various sensors may include an accelerometer, global-positioning system (GPS), gyroscope, magnetometer, camera, and other types of sensors useful for determining position and movement. The sensors may be included in a portable device held by the user or otherwise colocational with the human. Or in other embodiments, the sensors may be positioned colocationally with the human through other mechanisms, such as by attachment to the human's body or clothing.

At method operation 158.2, a process to determine the human position relative to a virtual world origin is performed. The virtual world may be positioned and oriented with reference to markers or anchors in the real world. A positioning method such as SLAM, or some other type of positioning method may be applied so as to enable determination of the human position relative to the virtual world origin. At method 158.3 the virtual character's position relative to the human's position is determined.

At method operation 158.4, a signaling attribute of the virtual character is oriented toward the human. The signaling attribute is an action of the virtual character that is performed so as to demonstrate that the character knows where the human is in his world. For example, a body orientation, a head orientation, an eye orientation, a weapon orientation, or a sound orientation, as well as other types of signal attributes, may be oriented toward the human so as to demonstrate that the virtual character knows where the human is located.

Figure 14:
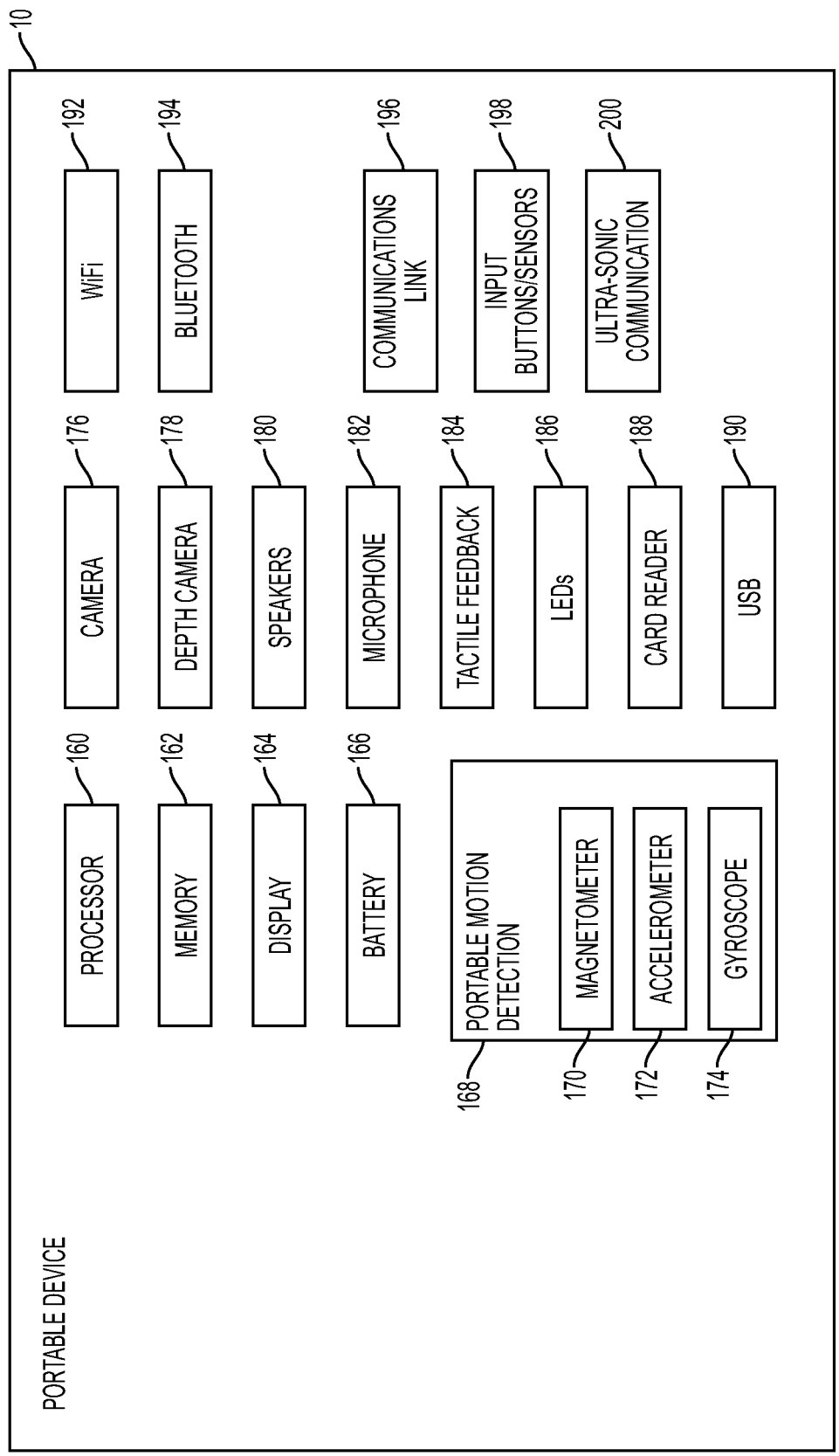
FIG. 14 illustrates a diagram showing components of a portable device, in accordance with an embodiment of the invention.

With reference to FIG. 14, a diagram illustrating components of a portable device 10 is shown, in accordance with an embodiment of the invention. The portable device 10 includes a processor 160 for executing program instructions. A memory 162 is provided for storage purposes, and may include both volatile and non-volatile memory. A display 164 is included which provides a visual interface that a user may view. A battery 166 is provided as a power source for the portable device 10. A motion detection module 168 may include any of various kinds of motion sensitive hardware, such as a magnetometer 170, an accelerometer 172, and a gyroscope 174.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 172 are used to provide the direction of gravity, which gives an absolute reference for 2 angles (world-space pitch and world-space roll).

A magnetometer measures the strength and direction of the magnetic field in the vicinity of the controller. In one embodiment, three magnetometers 170 are used within the controller, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 172 is used together with magnetometer 170 to obtain the inclination and azimuth of the portable device 10.

A gyroscope is a device for measuring or maintaining orientation, based on the principles of angular momentum. In one embodiment, three gyroscopes provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 176 is provided for capturing images and image streams of a real environment. More than one camera may be included in the portable device 10, including a camera that is rear-facing (directed away from a user when the user is viewing the display of the portable device), and a camera that is front-facing (directed towards the user when the user is viewing the display of the portable device). Additionally, a depth camera 178 may be included in the portable device for sensing depth information of objects in a real environment.

The portable device 10 includes speakers 180 for providing audio output. Also, a microphone 182 may be included for capturing audio from the real environment, including sounds from the ambient environment, speech made by the user, etc. The portable device 10 includes tactile feedback module 184 for providing tactile feedback to the user. In one embodiment, the tactile feedback module 184 is capable of causing movement and/or vibration of the portable device 10 so as to provide tactile feedback to the user.

LEDs 186 are provided as visual indicators of statuses of the portable device 10. For example, an LED may indicate battery level, power on, etc. A card reader 188 is provided to enable the portable device 10 to read and write information to and from a memory card. A USB interface 190 is included as one example of an interface for enabling connection of peripheral devices, or connection to other devices, such as other portable devices, computers, etc. In various embodiments of the portable device 10, any of various kinds of interfaces may be included to enable greater connectivity of the portable device 10.

A WiFi module 192 is included for enabling connection to the Internet via wireless networking technologies. Also, the portable device 10 includes a Bluetooth module 194 for enabling wireless connection to other devices. A communications link 196 may also be included for connection to other devices. In one embodiment, the communications link 196 utilized infrared transmission for wireless communication. In other embodiments, the communications link 196 may utilized any of various wireless or wired transmission protocols for communication with other devices.

Input buttons/sensors 198 are included to provide an input interface for the user. Any of various kinds of input interfaces may be included, such as buttons, touchpad, joystick, trackball, etc. An ultra-sonic communication module 200 may be included in portable device 10 for facilitating communication with other devices via ultra-sonic technologies.

The foregoing components of portable device 10 have been described as merely exemplary components that may be included in portable device 10. In various embodiments of the invention, the portable device 10 may or may not include some of the various aforementioned components. Embodiments of the portable device 10 may additionally include other components not presently described, but known in the art, for purposes of facilitating aspects of the present invention as herein described.

The foregoing portable device, and its included components, constitute means for initiating user interactivity with a computer program, and means for determining interaction with a virtual character. The portable device constitutes means for detecting sensor data from the user during interaction with the virtual character, and means for tracking the user position using the sensor data during the interaction with the virtual character. The portable device constitutes means for detecting the position of the virtual character during the user's interaction with the virtual character, and means for identifying a relative position between the user's position and the position o the virtual character during interaction with the virtual character by the user.

The portable device constitutes means for identifying a context of the interactivity, and means for identifying a signaling attribute for the context of interactivity. Additionally, the portable device constitutes means for applying the signaling attribute to the virtual character to convey an awareness of the user by the virtual character during the interactivity.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for causing a virtual character to demonstrate awareness of a user's position or activity, the method comprising,
    detecting a position of a portable device, the portable device being substantially colocational with the user, the portable device including a camera and a display, the camera capturing a first image stream of a real-world scene, wherein the detection of the position of the portable device comprises identification of an anchor within the first image stream, the anchor being tracked during movement of the portable device;
    generating a second image stream based on the first image stream, the second image stream comprising an augmented reality scene formed by inserting a virtual character into the real-world scene as captured in the first image stream, the virtual character being positioned in the augmented reality scene in relation to the identified anchor, the virtual character configured to perform an action indicating awareness of the position or activity of the user;
    displaying the second image stream on the display of the portable device;
    wherein the action indicating awareness comprises adjusting a view direction, in the augmented reality scene, of the virtual character, the view direction of the virtual character being defined relative to the anchor that is tracked during the movement of the portable device;
    wherein the adjustment of the view direction of the virtual character is in the direction of the position of the portable device and is defined by turning of the virtual character from a current view direction to an adjusted view direction facing the portable device, and wherein the adjustment of the view direction of the virtual character changes a relationship of the view direction to the anchor, wherein the adjustment of the view direction of the virtual character includes adjustment of a head or eyes of the virtual character so as to look in the direction of the portable device.

2. The method of claim 1, wherein the insertion of the virtual character into the real-world scene comprises placement of the virtual character on a surface identified within the real-world scene.

3. The method of claim 1, wherein the anchor is selected from the group consisting of one or more augmented reality tags and one or more features within the real-world scene.

4. The method of claim 1, wherein the performance of an action indicating awareness occurs automatically, without requiring a command from the user.

5. The method of claim 1, further comprising,
    continuously updating the adjustment of the view direction of the virtual character in the direction of the position of the portable device, as the portable device moves in three-dimensional space.

6. A method for causing a virtual character to demonstrate awareness of a user's position or activity, the method comprising,
   capturing a first image stream of a real-world scene at a camera of a portable device, the portable device being substantially colocational with the user;
   identifying and tracking one or more markers in the first image stream;
   tracking the position and orientation of the portable device based on the tracking of the one or more markers;
   generating a second image stream based on the first image stream, the second image stream depicting a virtual reality scene positioned with reference to the one or more markers in the first image stream, the virtual reality scene including a virtual character positioned with reference to the one or more markers in the first image stream and configured to perform an action indicating awareness of the position or activity of the user;
   displaying the second image stream on a display of the portable device;
   wherein the action indicating awareness comprises adjusting a view direction, in the virtual reality scene, of the virtual character, the view direction of the virtual character being defined relative to the one or more markers;
   wherein the adjustment of the view direction is in the direction of the position of the portable device, and wherein the adjustment of the view direction changes a relationship of the view direction to the one or more markers; and
   continuously updating the adjustment of the view direction as the portable device moves in three-dimensional space.

7. The method of claim 6, wherein the markers are selected from the group consisting of one or more augmented reality tags and one or more features within the real-world scene.

8. The method of claim 6, wherein the performance of an action indicating awareness occurs automatically, without requiring a command from the user.

9. The method of claim 6, wherein the adjustment of the view direction of the virtual character includes adjustment of a head or eyes of the virtual character so as to look in the direction of the portable device.

10. A method for providing user interactivity with a virtual character, the method comprising,
   initiating user interactivity with a computer program,
   determining user interaction with a virtual character of the computer program,
   detecting sensor data from the user during the user's interaction with the virtual character, wherein the sensor data includes an image stream captured by a portable device controlled by the user;
   tracking a position of the user using the sensor data, wherein the tracking of the position of the user includes identification and tracking of one or more markers within the image stream to enable determination of a position of the portable device;
   detecting a position of the virtual character during the user's interaction with the virtual character;
   identifying a relative positioning between the user's position and the position of the virtual character during the user's interaction with the virtual character;
   identifying a context of the user's interaction with the virtual character;
   identifying a signaling attribute for the context of the user's interaction with the virtual character;
   applying the signaling attribute to the virtual character to convey an awareness of the user by the virtual character;
   wherein the computer program provides a virtual reality environment positioned with reference to the one or more markers, the virtual reality environment including the virtual character positioned with reference to the one or more markers;
   wherein the user interactivity with the computer program includes interactivity with the virtual reality environment;
   wherein the signaling attribute is selected from the group consisting of adjustment of the virtual character's view direction in the virtual reality environment towards the position of the user so that the adjustment of the view direction changes a relationship of the view direction to the one or more markers, movement of the virtual character in the virtual reality environment towards the position of the user, gesturing by the virtual character in the virtual reality environment towards the position of the user.

11. The method of claim 10, wherein the computer program provides an augmented reality environment, the augmented reality environment including the virtual character; and
   wherein the user interactivity with the computer program includes interactivity with the augmented reality environment.

12. The method of claim 10, wherein the context of the user's interaction with the virtual character is selected from the group consisting of a location within a real-world environment, a location within a virtual environment, a stage within the computer program.

13. A method for providing interactivity with a virtual character, comprising:
   capturing, by a camera of a portable device, video of a real-world scene having one or more anchors;
   generating an augmented reality scene based on the captured image stream, the augmented reality scene including a virtual character positioned in the augmented reality scene in relation to the one or more anchors;
   rendering the augmented reality scene on a display of the portable device;
   tracking a direction of the camera of the portable device;
   adjusting a view direction of the virtual character, defined relative to the one or more anchors, in response to the tracked direction of the camera;
   wherein when the direction of the camera is towards the virtual character, then the view direction of the virtual character is adjusted towards a location of the portable device, and wherein the adjustment of the view direction of the virtual character changes a relationship of the view direction to the one or more anchors.

14. The method of claim 13, wherein the adjustment of the view direction of the virtual character towards the location of the portable device is defined by turning of the virtual character from a current view direction to an adjusted view direction facing the portable device.

15. The method of claim 14, wherein when the direction of the camera is towards an object in the augmented reality scene other than the virtual character, then the view direction of the virtual character is adjusted towards the object in the augmented reality scene.

* * * * *